(12) United States Patent
Yatsu et al.

(10) Patent No.: US 11,169,376 B2
(45) Date of Patent: Nov. 9, 2021

(54) PROJECTION OPTICAL SYSTEM AND HEAD-UP DISPLAY DEVICE

(71) Applicants: MAXELL, LTD., Otokuni-gun (JP); HITACHI INDUSTRY & CONTROL SOLUTIONS, LTD., Hitachi (JP)

(72) Inventors: Masahiko Yatsu, Otokuni-gun (JP); Koji Hirata, Otokuni-gun (JP); Shigeki Hoshino, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 150 days.

(21) Appl. No.: 16/338,253

(22) PCT Filed: Oct. 4, 2016

(86) PCT No.: PCT/JP2016/079540
§ 371 (c)(1),
(2) Date: Mar. 29, 2019

(87) PCT Pub. No.: WO2018/066081
PCT Pub. Date: Apr. 12, 2018

(65) Prior Publication Data
US 2020/0033596 A1    Jan. 30, 2020

(51) Int. Cl.
*G02B 27/01* (2006.01)
*G02F 1/1335* (2006.01)

(52) U.S. Cl.
CPC ... *G02B 27/0101* (2013.01); *G02F 1/133526* (2013.01); *G02B 2027/014* (2013.01);
(Continued)

(58) Field of Classification Search
CPC ...... G02F 1/133526; G02B 2027/0123; G02B 2027/0138; G02B 2027/014; G02B 27/0101; G02B 27/01
(Continued)

(56) References Cited

U.S. PATENT DOCUMENTS 4,799,765 A * 1/1989 Ferrer ................ G02B 27/0103
359/13
2002/0084950 A1    7/2002 Aoki et al.
(Continued)

FOREIGN PATENT DOCUMENTS

JP    2009-122582 A    6/2009
JP    2009-229552 A    10/2009
(Continued)

OTHER PUBLICATIONS

Takahashi et al., "Development of Full-Color Laser Head-up Display Using Laser Projector", Pioneer, R&D vol. 22, 2013.
(Continued)

*Primary Examiner* — William R Alexander
(74) *Attorney, Agent, or Firm* — Volpe Koenig

(57) ABSTRACT

An object of the present invention is to provide a compact head-up display device. The head-up display device of the present invention includes an image forming unit that emits image light containing image information, and an eyepiece optical system that displays a virtual image by reflecting the image light, in which the eyepiece optical system includes a concave lens, a free curved surface lens, and a free curved surface concave mirror disposed in order from the image forming unit side along the emission direction of the image light.

7 Claims, 29 Drawing Sheets

(52) U.S. Cl.
CPC .............. *G02B 2027/0123* (2013.01); *G02B 2027/0138* (2013.01)

(58) Field of Classification Search
USPC ........................................................ 359/630
See application file for complete search history.

(56) References Cited

U.S. PATENT DOCUMENTS

| | | |
|---|---|---|
| 2010/0157255 A1 | 6/2010 | Togino |
| 2013/0021224 A1 | 1/2013 | Fujikawa et al. |
| 2014/0126033 A1 | 5/2014 | Hirata et al. |
| 2015/0062697 A1* | 3/2015 | Komatsu .............. G02B 27/017 359/365 |
| 2016/0195719 A1 | 7/2016 | Yonetani |
| 2017/0045740 A1 | 2/2017 | Hirata et al. |
| 2017/0184843 A1* | 6/2017 | Kuzuhara .......... G02B 17/0848 |
| 2017/0322414 A1* | 11/2017 | Ishii ........................ G02B 3/08 |
| 2017/0357088 A1* | 12/2017 | Matsuzaki ............. B60K 35/00 |
| 2018/0017790 A1* | 1/2018 | Kuzuhara ............. B60K 37/02 |
| 2018/0081174 A1 | 3/2018 | Yatsu et al. |

FOREIGN PATENT DOCUMENTS

| | | |
|---|---|---|
| JP | 2010-164944 A | 7/2010 |
| JP | 2011-247997 A | 12/2011 |
| JP | 2012-058294 A | 3/2012 |
| JP | 2013-025205 A | 2/2013 |
| WO | 2012/176235 A1 | 12/2012 |
| WO | 2015/170406 A1 | 11/2015 |
| WO | 2016/162928 A1 | 10/2016 |

OTHER PUBLICATIONS

International Search Report dated Dec. 27, 2016 for the PCT International Application No. PCT/JP2016/079540.

* cited by examiner

FIG. 3

| NOMINAL | SURFACE NO. | SHAPE | CURVATURE RADIUS | INTERPLANAR DISTANCE | GLASS MATERIAL NAME | CONTENT OF DECENTERING/TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 16500 | | DECENTER & RETURN | 0 | 0 | 0 | 80 | 0 | 0 |
| ENTRANCE PUPIL | 1 | FLAT SURFACE | ∞ | -680 | | | 0 | 0 | 0 | -0.7 | 0 | 0 |
| WINDSHIELD | 2 | ANAMORPHIC ASPHERICAL SURFACE | 9686 / 5531 | 0 | REFLECTIVE | DECENTER & RETURN | -340 | -1959 | -2665 | -43.7 | 0 | 0 |
| DUMMY SURFACE | 3 | FLAT SURFACE | ∞ | 353.624 | | NORMAL DECENTERING | 0 | 0 | 0 | -130.759 | -6.846 | 0 |
| MIRROR | 4 | FREE CURVED SURFACE | -710.957 | 0 | REFLECTIVE | DECENTER & RETURN | 0 | 0 | 0 | -31.016 | -12.423 | -40.712 |
| DUMMY SURFACE | 5 | FLAT SURFACE | ∞ | -217.078 | | NORMAL DECENTERING | 0 | 0 | 0 | -30.157 | -8.520 | 0 |
| MIRROR | 6 | FLAT SURFACE | ∞ | 0 | REFLECTIVE | DECENTER & RETURN | 0 | 0 | 0 | 30.289 | 2.361 | 0 |
| DUMMY SURFACE | 7 | FLAT SURFACE | ∞ | 107.745 | | NORMAL DECENTERING | 0 | 0 | 0 | 84.326 | 2.803 | 0 |
| L1 | 8 | FREE CURVED SURFACE | ∞ | 2.000 | 'PMMA25' | NORMAL DECENTERING | 5.091 | -7.494 | 0 | 2.466 | -14.293 | 0.041 |
| | 9 | FREE CURVED SURFACE | ∞ | 33.938 | | NORMAL DECENTERING | 5.333 | -36.214 | 0 | 0 | 0 | 0 |
| L2 | 10 | SPHERICAL SURFACE | -114.988 | 4.700 | SLAM66 | NORMAL DECENTERING | 0.499 | -38.333 | 0 | -36.966 | -1.711 | 13.451 |
| | 11 | FLAT SURFACE | ∞ | 1.240 | | | 0 | 0 | 0 | 0 | 0 | 0 |
| POLARIZATION PLATE/BASE MATERIAL | 12 | FLAT SURFACE | ∞ | 0.122 | 50.30 | | 0 | 0 | 0 | 0 | 0 | 0 |
| | 13 | FLAT SURFACE | ∞ | 0.600 | 52.60 | | 0 | 0 | 0 | 0 | 0 | 0 |
| | 14 | FLAT SURFACE | ∞ | 0.000 | | | 0 | 0 | 0 | 0 | 0 | 0 |
| INTERMEDIATE IMAGE | 15 | FLAT SURFACE | ∞ | 0.000 | | | 0 | 0 | 0 | 0 | 0 | 0 |

FIG. 4

| CODE | | MIRROR SURFACE (4TH) | L1A SURFACE (8TH) | L1B SURFACE (9TH) |
|---|---|---|---|---|
| R | 1/c | −710.957 | ∞ | ∞ |
| K | K | −1.84494 | | |
| C2 | $X$ | 4.47944E−01 | 9.96573E−02 | |
| C3 | $Y$ | −8.11952E−02 | −1.45254E−01 | |
| C4 | $X^2$ | −6.60896E−05 | −2.40241E−03 | −3.05521E−03 |
| C5 | $XY$ | −1.31216E−04 | 4.40825E−03 | −8.61075E−03 |
| C6 | $Y^2$ | 3.17340E−05 | −2.93085E−02 | −4.74723E−03 |
| C7 | $X^3$ | 7.44638E−07 | −6.79589E−05 | 2.74246E−05 |
| C8 | $X^2Y$ | 6.50020E−08 | 1.44061E−04 | −2.42243E−05 |
| C9 | $XY^2$ | 5.08521E−07 | 2.70281E−04 | −2.54718E−04 |
| C10 | $Y^3$ | −9.15680E−08 | −1.20861E−04 | 8.10810E−05 |
| C11 | $X^4$ | −7.81224E−10 | 1.52039E−06 | −7.73734E−07 |
| C12 | $X^3Y$ | 9.69936E−10 | 1.03065E−06 | 2.55001E−06 |
| C13 | $X^2Y^2$ | −1.64539E−09 | 4.64614E−06 | −5.14882E−06 |
| C14 | $XY^3$ | 9.02586E−10 | 5.48504E−06 | −4.65230E−06 |
| C15 | $Y^4$ | −8.28544E−10 | 8.34279E−06 | 2.40885E−08 |
| C16 | $X^5$ | 2.64296E−12 | −5.05676E−09 | 1.19082E−08 |
| C17 | $X^4Y$ | 1.23069E−11 | 2.30730E−08 | −4.10172E−08 |
| C18 | $X^3Y^2$ | −6.01710E−12 | 1.47599E−07 | −6.83534E−08 |
| C19 | $X^2Y^3$ | 6.56651E−12 | 1.80655E−08 | −1.31103E−07 |
| C20 | $XY^4$ | 9.55142E−13 | −1.87749E−08 | −4.45397E−08 |
| C21 | $Y^5$ | 8.54085E−13 | 2.85229E−08 | −4.93600E−08 |
| C22 | $X^6$ | 4.96247E−14 | 1.66159E−10 | 1.98402E−10 |
| C23 | $X^5Y$ | −4.98916E−14 | 8.32609E−11 | 1.55862E−09 |
| C24 | $X^4Y^2$ | 1.53392E−13 | −9.44058E−11 | 6.91783E−10 |
| C25 | $X^3Y^3$ | −1.49259E−13 | 2.41445E−09 | −7.34931E−09 |
| C26 | $X^2Y^4$ | 2.47485E−13 | −5.05905E−10 | −3.85824E−10 |
| C27 | $XY^5$ | −1.50298E−13 | −7.50455E−10 | 9.86404E−10 |
| C28 | $Y^6$ | 8.62937E−14 | −1.04570E−09 | 9.50594E−10 |
| C29 | $X^7$ | 2.38676E−16 | 8.31872E−13 | 3.37804E−13 |
| C30 | $X^6Y$ | −7.52622E−17 | 8.55385E−12 | −1.25351E−12 |
| C31 | $X^5Y^2$ | 6.05135E−16 | 7.93082E−12 | 4.82934E−11 |
| C32 | $X^4Y^3$ | 6.11933E−16 | −5.61220E−12 | 4.96131E−11 |
| C33 | $X^3Y^4$ | −2.26585E−16 | −1.41337E−11 | −1.71038E−10 |
| C34 | $X^2Y^5$ | 8.60953E−16 | 2.17831E−12 | 1.67774E−11 |
| C35 | $XY^6$ | −1.35525E−16 | 1.09376E−11 | 3.33417E−11 |
| C36 | $Y^7$ | 1.90255E−17 | 3.07852E−11 | 4.07027E−11 |
| C37 | $X^8$ | 1.92381E−19 | −1.54917E−14 | −2.85672E−14 |
| C38 | $X^7Y$ | 2.84856E−18 | 6.15593E−14 | −1.21546E−14 |
| C39 | $X^6Y^2$ | −1.11954E−18 | 3.01932E−13 | −7.62260E−14 |
| C40 | $X^5Y^3$ | 1.49781E−18 | 1.01833E−13 | 3.57990E−13 |
| C41 | $X^4Y^4$ | 6.04207E−18 | −3.05356E−13 | 4.79601E−13 |
| C42 | $X^3Y^5$ | −2.99940E−19 | −6.65397E−13 | −1.25943E−12 |
| C43 | $X^2Y^6$ | −4.50379E−19 | 3.25713E−13 | 1.44938E−13 |
| C44 | $XY^7$ | 9.74405E−19 | 2.71427E−13 | 2.62116E−13 |
| C45 | $Y^8$ | −2.23786E−18 | 7.54889E−13 | 2.87968E−13 |
| C46 | $X^9$ | 2.07731E−21 | 5.21635E−17 | |
| C47 | $X^8Y$ | −5.58768E−21 | −9.71550E−17 | |
| C48 | $X^7Y^2$ | 1.52929E−20 | 1.25980E−15 | |
| C49 | $X^6Y^3$ | 6.58719E−22 | 4.03298E−15 | |
| C50 | $X^5Y^4$ | −1.64242E−20 | 7.85770E−16 | |
| C51 | $X^4Y^5$ | 1.02916E−20 | −3.69627E−15 | |
| C52 | $X^3Y^6$ | 1.69557E−20 | −4.30406E−15 | |
| C53 | $X^2Y^7$ | −4.64402E−21 | 2.99505E−15 | |
| C54 | $XY^8$ | −2.03005E−20 | 1.31212E−15 | |
| C55 | $Y^9$ | 2.70007E−21 | 3.88477E−15 | |

FIG. 5D
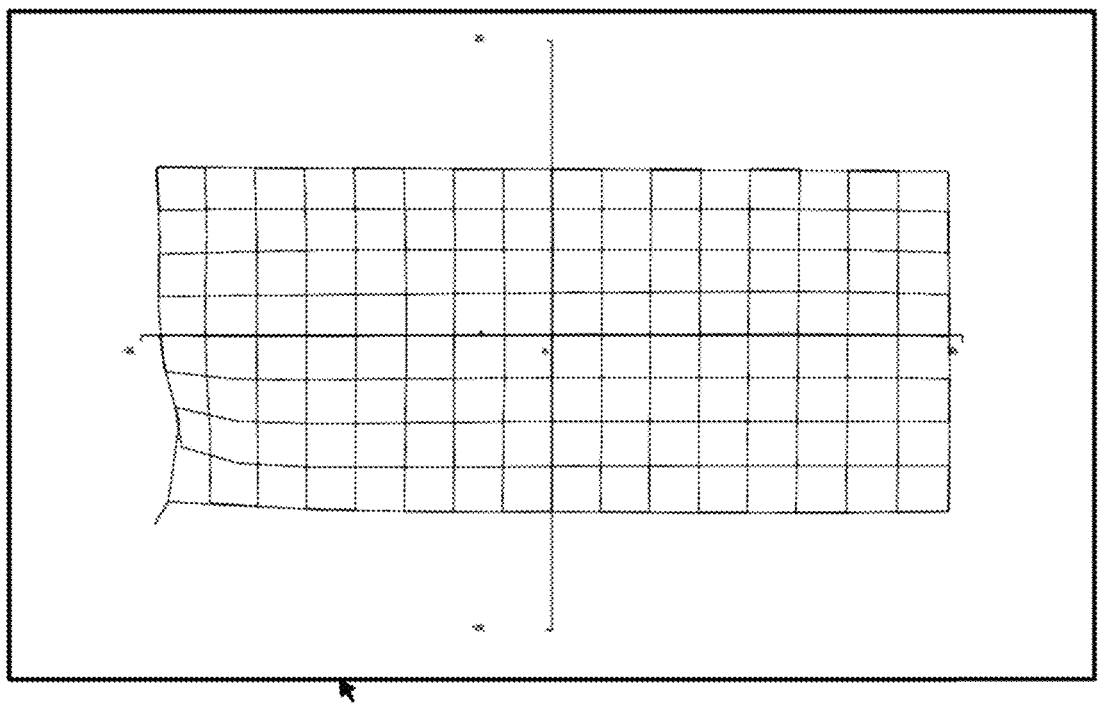
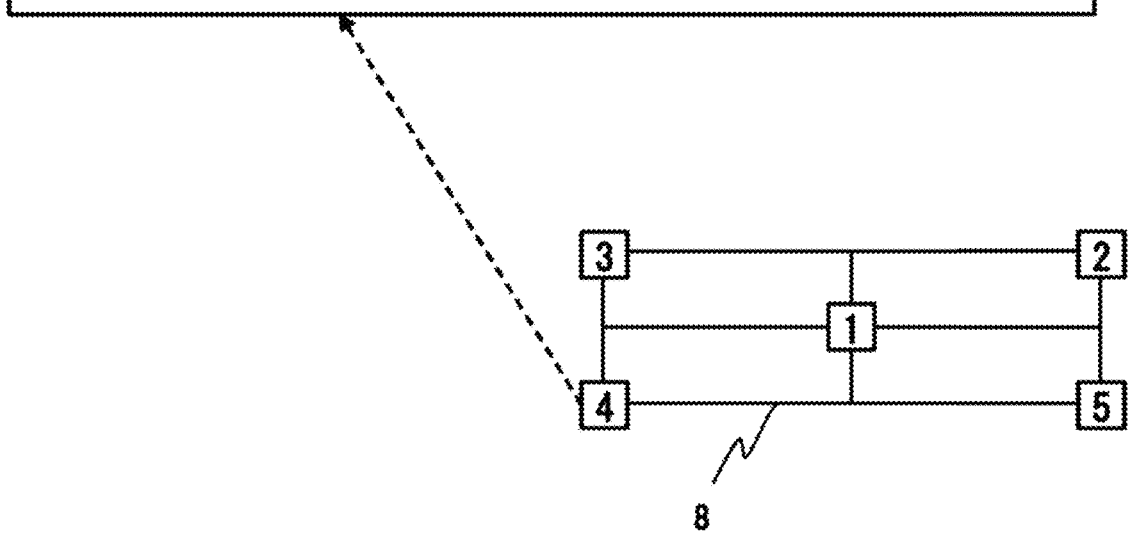

FIG. 5E
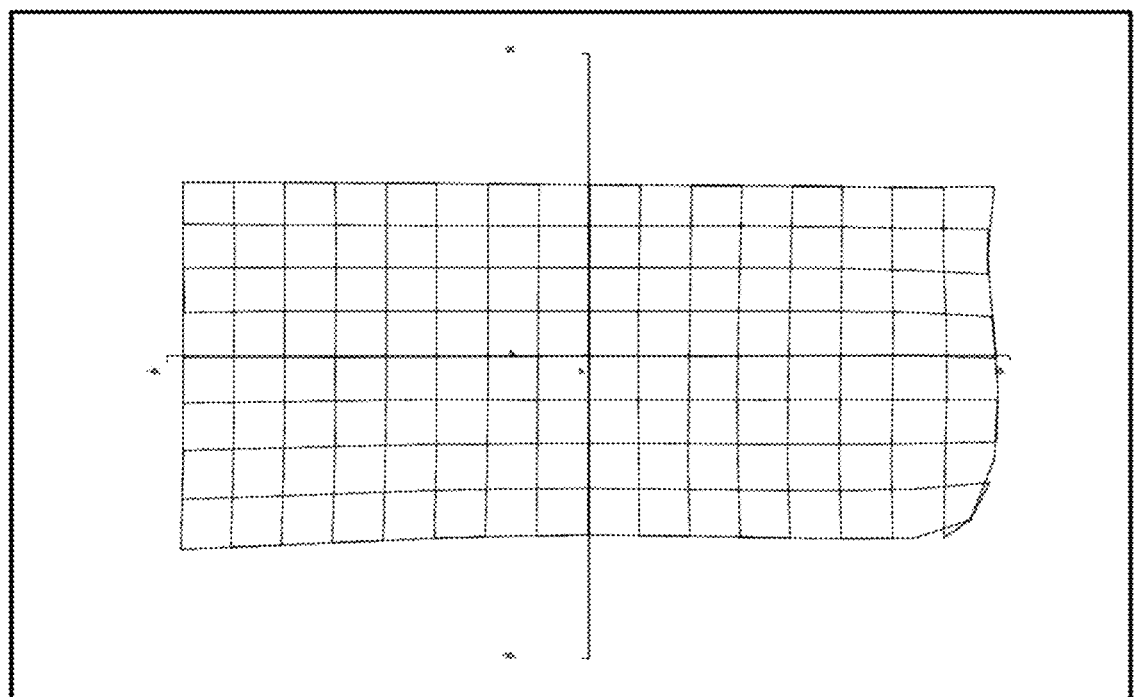
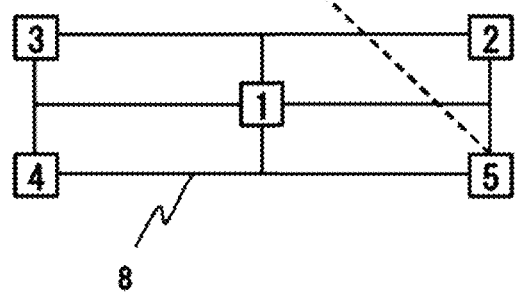

FIG.10

| NOMINAL | SURFACE NO. | SHAPE | CURVATURE RADIUS | INTERPLANAR DISTANCE | GLASS MATERIAL NAME | CONTENT OF DECENTERING /TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| OBJECT SURFACE/VIRTUAL IMAGE | 0 | FLAT SURFACE | ∞ | 2100 | | | | | | | | |
| ENTRANCE PUPIL | 1 | FLAT SURFACE | ∞ | -784.68 | | NORMAL DECENTERING | 0 | 0 | 0 | -5.08 | 0 | 0 |
| MIRROR M1 | 2 | FREE CURVED SURFACE | ∞ | 0 | REFLECTIVE | DECENTER & RETURN | 380 | -0.1 | -46.3 | 0 | 0 | 0 |
| DUMMY SURFACE | 3 | FLAT SURFACE | ∞ | 394.109 | | NORMAL DECENTERING | 0 | 0 | 0 | -143.317 | 5.835 | 0 |
| MIRROR M2 | 4 | FREE CURVED SURFACE | -375.615 | 0 | REFLECTIVE | DECENTER & RETURN | 0 | 0 | 0 | -24.725 | 12.656 | 39.843 |
| DUMMY SURFACE | 5 | FLAT SURFACE | ∞ | -118.190 | | NORMAL DECENTERING | 0 | 0 | 0 | -41.662 | 22.055 | 0 |
| FREE-FORMED CURVED SURFACE LENS | 6 | FREE CURVED SURFACE | ∞ | -4.8 | 'PMMA25' | NORMAL DECENTERING | 0 | 0 | 0 | 21.508 | -37.830 | -22.031 |
| | 7 | FREE CURVED SURFACE | ∞ | -22.045 | | | 16.824 | -1.083 | 0 | 0 | 0 | 0 |
| SPHERICAL LENS | 8 | SPHERICAL SURFACE | 72.509 | -2.450 | SLAM66 | | -10.102 | -1.061 | 0 | 5.544 | 13.889 | 9.98631 |
| | 9 | SPHERICAL SURFACE | ∞ | -0.125 | | | 0 | 0 | 0 | 0 | 0 | 0 |
| POLARIZATION PLATE/BASE MATERIAL | 10 | FLAT SURFACE | ∞ | -0.122 | 50.300 | NORMAL DECENTERING | 4.450 | -5.187 | 0 | 0 | 0 | 0 |
| | 11 | FLAT SURFACE | ∞ | -0.6 | 52.649 | | 0 | 0 | 0 | 0 | 0 | 0 |
| | 12 | FLAT SURFACE | ∞ | 0 | | | 0 | 0 | 0 | 0 | 0 | 0 |
| IMAGE SURFACE LCD | 13 | FLAT SURFACE | ∞ | 0 | | | 0 | 0 | 0 | 0 | 0 | 0 |

FIG. 11

| CODE | | MIRROR SURFACE (2ND) | MIRROR SURFACE (4TH) | LENS SURFACE (6TH) | LENS SURFACE (7TH) |
|---|---|---|---|---|---|
| R | $1/c$ | ∞ | −375.615 | ∞ | ∞ |
| K | K | | −1.46177 | | |
| C2 | $x$ | | −2.93692E−01 | 5.93211E−01 | |
| C3 | $Y$ | 1.92070E+00 | −7.99564E−02 | −9.28628E−02 | |
| C4 | $X^2$ | 2.83990E−04 | −4.77833E−04 | −7.70287E−03 | −2.11747E−02 |
| C5 | $XY$ | | −1.00477E−04 | −5.95241E−03 | −1.13685E−02 |
| C6 | $Y^2$ | 7.81820E−04 | −4.56977E−04 | 5.97402E−02 | 3.42151E−02 |
| C7 | $X^3$ | | −3.99600E−06 | −1.60584E−04 | −1.94898E−04 |
| C8 | $X^2Y$ | 5.33890E−07 | 2.69807E−06 | −6.57808E−05 | −1.68420E−04 |
| C9 | $XY^2$ | | −3.44480E−07 | −1.02430E−04 | 1.78289E−04 |
| C10 | $Y^3$ | 1.44540E−07 | −4.93503E−07 | 5.73027E−04 | 7.69528E−05 |
| C11 | $X^4$ | 3.12850E−10 | −1.81609E−10 | 2.30029E−06 | −3.68760E−06 |
| C12 | $X^3Y$ | | −1.25668E−09 | −4.68328E−07 | −1.27901E−05 |
| C13 | $X^2Y^2$ | 1.29950E−10 | −1.80755E−08 | −3.65521E−05 | 2.09264E−05 |
| C14 | $XY^3$ | | 1.70820E−09 | −3.31006E−05 | −1.09812E−05 |
| C15 | $Y^4$ | −5.24300E−09 | 1.92801E−12 | −2.64510E−05 | −1.00445E−05 |
| C16 | $X^5$ | | −5.45859E−11 | 4.58702E−08 | 8.64469E−08 |
| C17 | $X^4Y$ | −6.35040E−13 | 1.81348E−11 | −3.10235E−07 | −3.95642E−09 |
| C18 | $X^3Y^2$ | | −3.03880E−11 | 1.45349E−06 | −2.73207E−07 |
| C19 | $X^2Y^3$ | 4.24900E−12 | 2.78897E−11 | −7.44711E−07 | 1.59346E−06 |
| C20 | $XY^4$ | | −3.17018E−11 | −2.77455E−06 | −3.30498E−06 |
| C21 | $Y^5$ | −1.63760E−13 | −1.10692E−12 | 7.82807E−09 | 1.38557E−07 |
| C22 | $X^6$ | −6.21710E−16 | −2.55154E−13 | −6.08639E−09 | −9.56981E−10 |
| C23 | $X^5Y$ | | 6.05653E−13 | 1.14605E−08 | −4.89500E−10 |
| C24 | $X^4Y^2$ | 5.30230E−16 | 4.18687E−13 | −1.97927E−08 | −3.36104E−08 |
| C25 | $X^3Y^3$ | | 6.82302E−13 | 7.21263E−08 | 5.13593E−08 |
| C26 | $X^2Y^4$ | 8.86800E−14 | 7.36689E−13 | −1.90693E−08 | −8.43106E−08 |
| C27 | $XY^5$ | | 3.46970E−13 | −1.39004E−08 | −6.08964E−08 |
| C28 | $Y^6$ | 1.22860E−13 | 3.82038E−13 | −2.92377E−09 | −4.15809E−08 |
| C29 | $X^7$ | | −1.54251E−15 | 1.94193E−10 | −1.03956E−10 |
| C30 | $X^6Y$ | 3.80480E−18 | −6.11267E−16 | −7.00897E−11 | −9.09961E−11 |
| C31 | $X^5Y^2$ | | 5.96231E−15 | −3.15940E−10 | −4.70829E−10 |
| C32 | $X^4Y^3$ | −5.15920E−18 | −3.11418E−15 | −5.57157E−10 | 2.42181E−10 |
| C33 | $X^3Y^4$ | | 4.08442E−15 | 1.83771E−09 | 1.70235E−09 |
| C34 | $X^2Y^5$ | 1.25060E−16 | 2.83456E−15 | −6.31973E−10 | −5.81450E−09 |
| C35 | $XY^6$ | | 2.67269E−15 | 1.4073E−09 | 3.61792E−09 |
| C36 | $Y^7$ | −3.47380E−16 | −5.86159E−16 | 2.14885E−10 | −3.22382E−09 |
| C37 | $X^8$ | 1.41220E−21 | −1.81773E−18 | −2.21773E−12 | |
| C38 | $X^7Y$ | | −1.71869E−17 | −9.74684E−13 | |
| C39 | $X^6Y^2$ | 1.60140E−20 | 5.23585E−17 | 7.03470E−12 | |
| C40 | $X^5Y^3$ | | −2.70487E−18 | −9.77572E−12 | |
| C41 | $X^4Y^4$ | −4.78450E−19 | −1.95619E−18 | −1.93199E−11 | |
| C42 | $X^3Y^5$ | | 1.96279E−17 | 7.68491E−12 | |
| C43 | $X^2Y^6$ | −2.07340E−18 | 2.23254E−17 | 6.14667E−11 | |
| C44 | $XY^7$ | | 4.77439E−19 | −1.09117E−10 | |
| C45 | $Y^8$ | −2.16160E−18 | 2.05343E−18 | 8.42285E−11 | |
| C46 | $X^9$ | | 8.46556E−20 | | |
| C47 | $X^8Y$ | −4.78040E−24 | 4.09194E−20 | | |
| C48 | $X^7Y^2$ | | −1.32363E−19 | | |
| C49 | $X^6Y^3$ | −4.24990E−23 | 5.55773E−19 | | |
| C50 | $X^5Y^4$ | | −2.78066E−19 | | |
| C51 | $X^4Y^5$ | −2.97720E−21 | 2.56338E−20 | | |
| C52 | $X^3Y^6$ | | 1.39781E−19 | | |
| C53 | $X^2Y^7$ | −5.12040E−21 | 2.16434E−19 | | |
| C54 | $XY^8$ | | −1.33105E−19 | | |
| C55 | $Y^9$ | 1.88170E−20 | 6.86121E−20 | | |
| C56 | $X^{10}$ | −1.39350E−27 | | | |
| C57 | $X^9Y$ | | | | |
| C58 | $X^8Y^2$ | −3.39430E−26 | | | |
| C59 | $X^7Y^3$ | | | | |
| C60 | $X^6Y^4$ | −5.30780E−26 | | | |
| C61 | $X^5Y^5$ | | | | |
| C62 | $X^4Y^6$ | −6.10680E−24 | | | |
| C63 | $X^3Y^7$ | | | | |
| C64 | $X^2Y^8$ | 1.02510E−23 | | | |
| C65 | $XY^9$ | | | | |
| C66 | $Y^{10}$ | 7.15920E−23 | | | |

FIG.12B
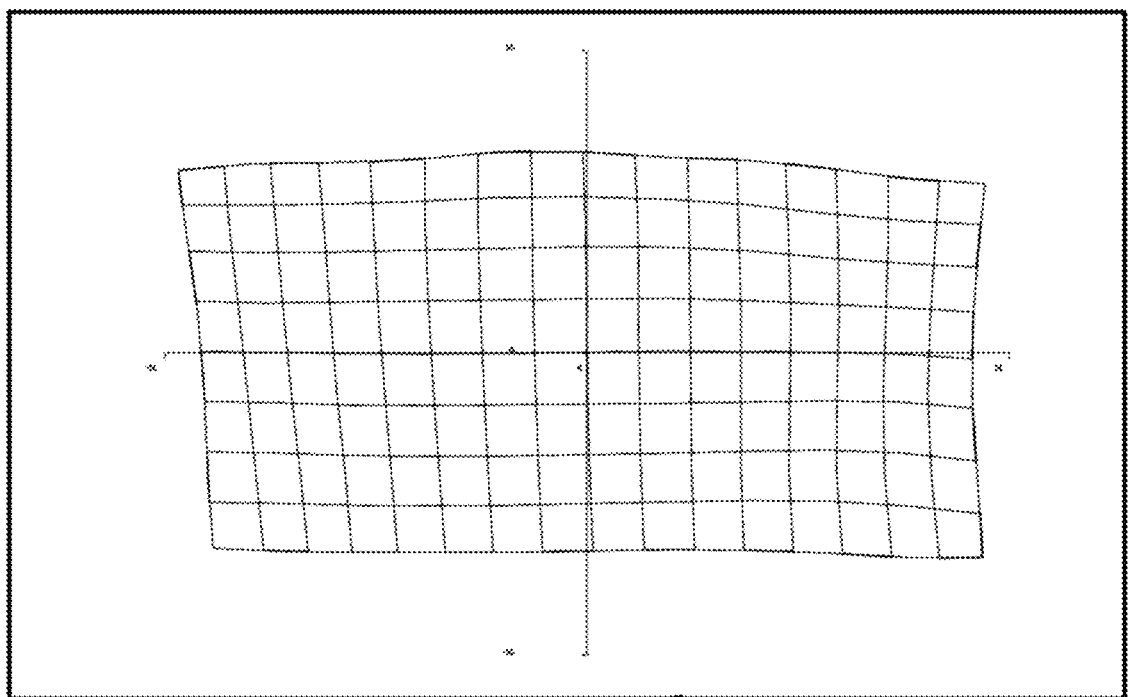
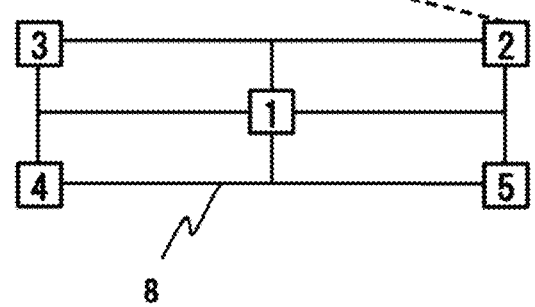

PROJECTION OPTICAL SYSTEM AND HEAD-UP DISPLAY DEVICE

TECHNICAL FIELD

The present invention relates to a projection optical system and a head-up display device.

BACKGROUND ART

There is known a head-up display device in which an image is projected to a windshield provided in a mobile object such as an automobile and an airplane, and the projected image is observed as a virtual image through the windshield.

In Patent Literature 1 for example, as a head-up display device according to a prior art, there is disclosed a device "provided with a projection optical system in which light is irradiated from the back of a transmission type liquid crystal display panel, and an image displayed on the liquid crystal display panel is enlarged and projected (excerption of the abstract)".

Also, in In Patent Literature 2, there is disclosed "A display apparatus that includes a first mirror and a second mirror in order along an optical path from a display device to a viewer (to guide the image to a viewpoint area of the viewer and to display a virtual image), and satisfies conditions of θx>θy (θx: an incident angle in the long axis direction of the image on the first mirror, θy: an incident angle in the short axis direction of the image on the first mirror) and 0.2<D1/Lh<0.9 (D1: a distance between an image display surface of the display device and the first mirror (an optical path length at the center of the viewpoint area, Lh: a horizontal width of a virtual image visually recognized by the viewer) (excerption of the abstract)".

Also, in Patent Literature 3, there is disclosed a display device for use in a vehicle including "a correction member that is disposed between a windshield and a display device and transmits light of an image there through so as to correct the image to be projected on the windshield so that distortion of the image, which is seen from an eye point, arising from non-plane of a projection area is canceled out (excerption of the abstract)".

Further, in Non-patent Literature 1, there is disclosed a head-up display device that includes tilting of a screen and a configuration of disposing a convex lens as a field lens in order to correct distortion arising in a concave mirror.

CITATION LIST

Patent Literature

PATENT LITERATURE 1: JP-A No. 2009-229552
PATENT LITERATURE 2: US Patent Application Publication No. 2016/195719
PATENT LITERATURE 3: US Patent Application Publication No. 2002/084950

Non-Patent Literature

NON-PATENT LITERATURE 1: PIONEER R&D (Vol. 22, 2013)

SUMMARY OF INVENTION

Technical Problem

In the head-up display device disclosed in Patent Literature 2, there is provided a thin type head-up display device that is achieved by arranging a display device and a first mirror (rotationally asymmetric mirror) so as to be shifted in the horizontal direction. However, the first embodiment of Patent Literature 2 has the virtual image size of 140×70 mm which is horizontally long, and has a configuration of folding the light flux in the horizontal direction that has the light flux size of 2 times of that of the vertical direction. Therefore, the reflecting mirror becomes large, and compactization of the volume of the head-up display device is hard even in the thin type head-up display device.

In an example of the head-up display device disclosed in Patent Literature 3, although correction of distortion arising from non-plane of the projection area of the windshield is disclosed, consideration is not given to distortion arising from the concave mirror disclosed in Non-patent Literature 1. With respect to the Non-patent Literature 1 also, although the screen is tilted and the convex lens as a field lens is disposed in order to correct the distortion arising in the concave mirror, the performance on the telecentric property in the liquid crystal display panel disclosed in Patent Literature 1 is not satisfied. Thus, the fact of the projection optical system and the head-up display device is that there is still a room for further improvement for compactization of the device while securing required performance.

The present invention has been achieved in view of the fact described above, and its object is to minimize the optical configuration of a projection optical system while securing required performance and to provide a head-up display device of a compact type.

Solution to Problem

In order to solve the problem described above, the present invention has configurations described in claims. As an aspect of the present invention, the present invention is a projection optical system including an eyepiece optical system that generates image information and displays a virtual image by reflecting image light emitted from an image forming unit that emits the image light containing the image information, in which the eyepiece optical system includes a concave lens, a free curved surface lens, and a free curved surface concave mirror disposed in order from the image forming unit side along the emission direction of the image light.

Advantageous Effect of Invention

According to the present invention, it is possible to minimize the optical configuration of a projection optical system while securing required performance and to provide a head-up display device of a compact type. Also, problems, configurations, and effects other than those described above will be clarified by explanation of embodiments described below.

BRIEF DESCRIPTION OF DRAWINGS

FIG. 3 is a drawing that shows lens data of a head-up display device according to the first embodiment.
FIG. 4 is a drawing of free curved surface factors of the head-up display device according to the first embodiment.

FIG. 5D is a drawing that shows the distortion property as viewed from the bottom left of the eye box in the first embodiment.

FIG. 5E is a drawing that shows the distortion property as viewed from the bottom right of the eye box in the first embodiment.

FIG. 10 is a drawing that shows lens data of a head-up display device according to the second embodiment.

FIG. 11 is a drawing of free curved surface factors of the head-up display device according to the second embodiment.

FIG. 12B is a drawing that shows the distortion property as viewed from the top right of the eye box in the second embodiment.

DESCRIPTION OF EMBODIMENTS

Hereinafter, an embodiment and various examples of the present invention will be explained using the drawings and the like. Explanations below show concrete examples of the content of the present invention, the present invention is not limited to these explanations, and various alterations and amendments by a person with an ordinary skill in the art can be effected within the range of the technical thoughts disclosed in the present description. Also, in all drawings for explaining the present invention, those having a same function are marked with a same reference sign, and there is a case of omitting repeated explanation for them. Hereinafter, items common to all embodiments will be explained, and the features of each embodiment will be explained next.

Figure 17:
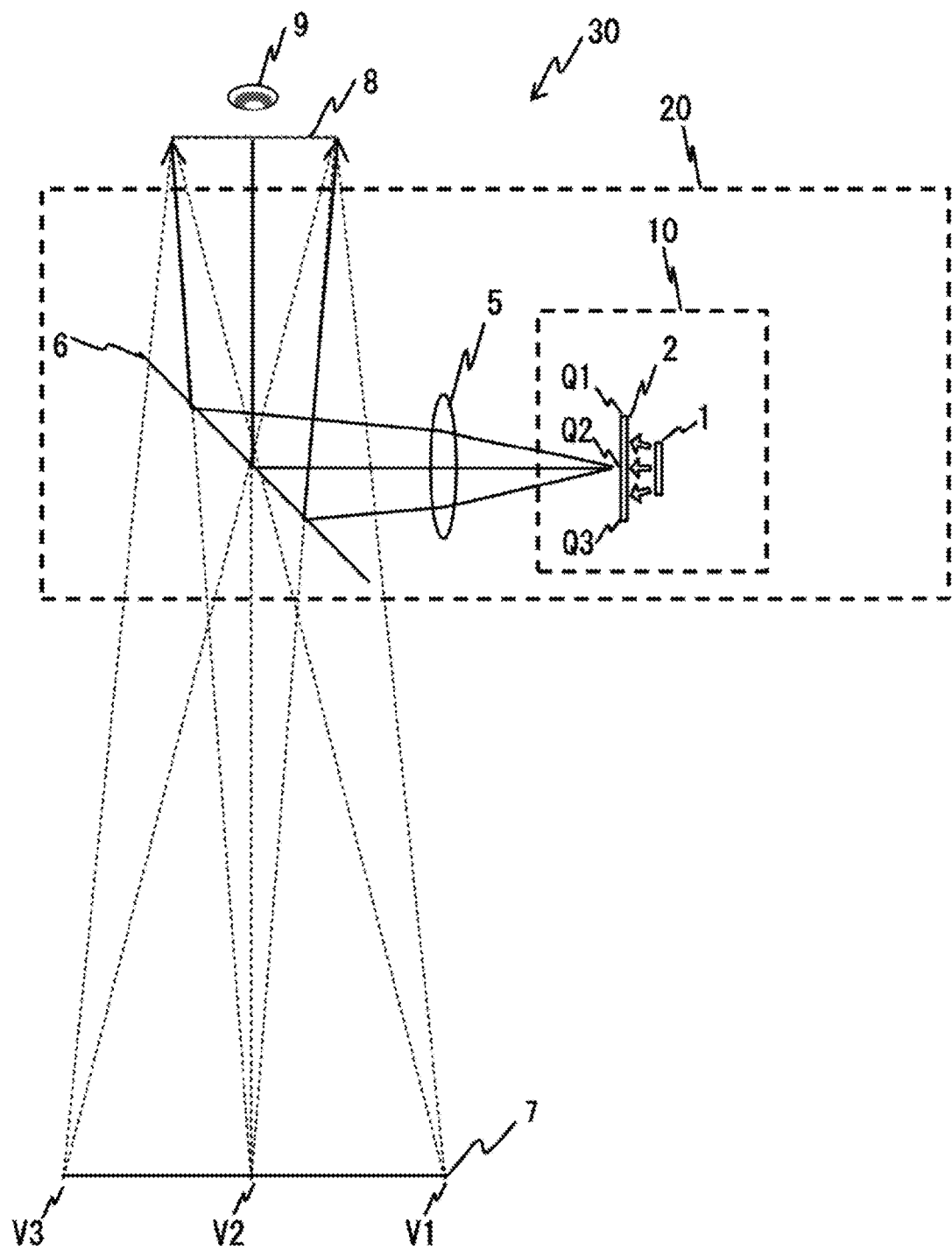
FIG. 17 is a schematic configuration drawing of a head-up display device.

The basic configuration of a head-up display device 30 will be explained using FIG. 17. FIG. 17 is a schematic configuration drawing of the head-up display device 30.

The head-up display device 30 shown in FIG. 17 has such configuration that image light emitted from a projection optical system 20 including an image forming unit 10 and an eyepiece optical system 5 is made to be reflected by a windshield 6 of an automobile and is made to be incident on eyes 9 of a viewer. By this configuration, as viewed from the eyes 9 of the viewer, it becomes a state where as if image information is viewed at a virtual image plane 7. The direction along which the image light emitted by the image forming unit 10 is reflected by the windshield 6 after passing through the eyepiece optical system 5 is equivalent to the emission direction of the image light.

Figure 20:
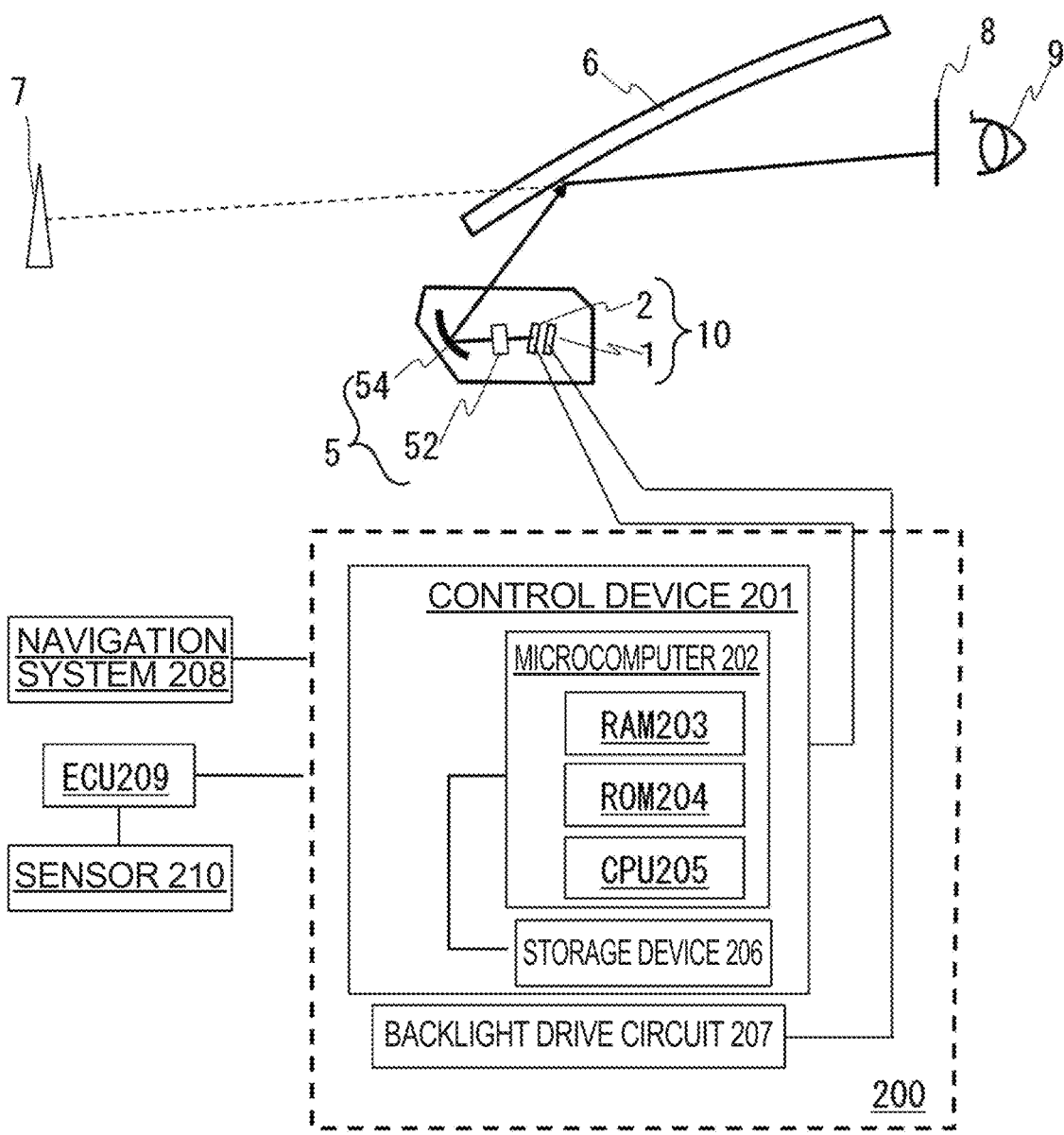
FIG. 20 is a functional block diagram of the image forming unit.

First, the image forming unit 10 will be explained referring to FIG. 20. FIG. 20 is a functional block diagram of the image forming unit. As shown in FIG. 20, the image forming unit 10 includes a liquid crystal display panel 2, a backlight 1, and a controller 200 that controls operation of them. The image forming unit 10 irradiates light from the backlight 1 to the liquid crystal display panel 2, and emits image information (image information) displayed on the liquid crystal display panel 2 toward the eyepiece optical system 5.

The controller 200 includes a control device 201. To this control device 201, various information is inputted from external devices. For example, as the external devices, a navigation system 208 and an ECU (Electronic Control Unit) 209 are connected to the control device 201, the navigation system 208 being a navigation apparatus that generates and outputs information on the motion of a movable object mounted with the head-up display device 30, the ECU 209 controlling the motion of the movable object.

Various kinds of sensors 210 included in the movable object are connected to the ECU 209, and it is configured to notify the ECU 209 of detected information.

The controller 200 includes the control device 201 and a backlight drive circuit 207, the control device 201 processing various kinds of data from the external devices explained above, the backlight drive circuit 207 being for driving the backlight 1.

The control device 201 includes a microcomputer 202 and a storage device 206 that is connected to the microcomputer 202.

The microcomputer 202 includes a RAM (Random Access Memory) 203, a CPU (Central Processing Unit) 205, and a ROM (Read Only Memory) 204, the RAM 203 being for storing various kinds of data from the external devices, the CPU 205 for executing a calculation process for generating image data that become a source of a virtual image viewed by the viewer, the ROM 204 storing a program and a parameter which can execute the calculation process in the CPU 205.

The controller 200 having the configuration described above displays image information on the liquid crystal display panel 2 that is included in the image forming unit 10. The image forming unit 10 emits the image information displayed on the liquid crystal display panel 2 as an image light flux by a light flux irradiated by the backlight 1.

Returning to FIG. 17, the image light flux generated and emitted in the image forming unit 10 is projected to the windshield 6 by the eyepiece optical system 5. The image light flux projected to the windshield 6 is reflected by the windshield 6, and reaches the position of the eyes 9 of the viewer. Thus, as viewed from the eyes 9 of the viewer, such relation as if the image information of the virtual image plane 7 is viewed is established.

As shown in FIG. 17, imaginal points of a point Q1, a point Q2, and a point Q3 are assumed at the emission plane of the image light flux at the liquid crystal display panel 2. When imaginal points at the virtual image plane 7 to which the image light flux emitted from these imaginal points correspond are considered, a point V1, a point V2, and a point V3 correspond to them as shown in FIG. 17. A range where the point V1, the point V2, and the point V3 at the virtual image plane 7 can be viewed even when the viewer moves the position of the eyes 9 is an eye box 8.

Although FIG. 17 illustrates the head-up display device 30 by a side view, because the actual configuration of the head-up display device 30 is cubical, the eye box 8 has a 2-dimensional spread. Thus, the eyepiece optical system 5 is an optical system that displays an image (virtual image) of an object (spatial image) in front of the eyes of a viewer similarly to an ocular lens of a finder of a camera or an ocular lens of a microscope.

Figure 21:
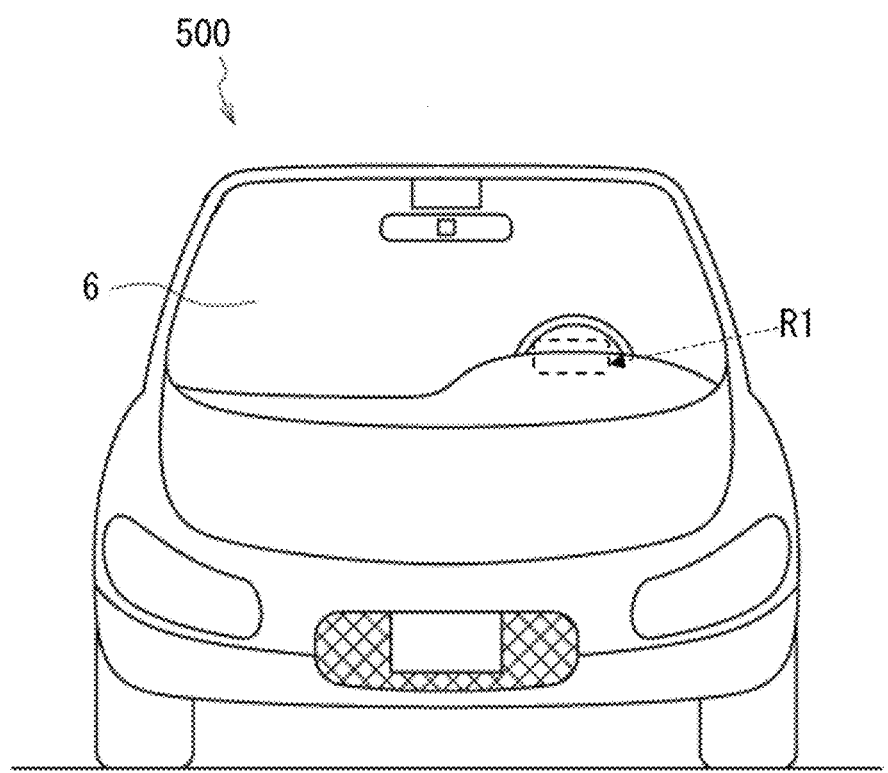
FIG. 21 is a plan view of an automobile that is a movable object as viewed from the front.

Here, an example of a case of mounting the head-up display device 30 according to the present embodiment on a movable object will be explained using FIG. 21. FIG. 21 is a plan view of an automobile 500 that is a movable object as viewed from the front. In such automobile 500 as shown in FIG. 21, the windshield 6 that is a front glass is disposed in front of the driver seat as a wind guard.

The head-up display device 30 allows the viewer sitting on the driver seat to be in a state of capable of viewing various kinds of information related to the motion of the automobile 500 as a virtual image by projecting the image light flux to the windshield 6. The position where the image light flux is projected is the front of the driver seat and its surroundings. The image light flux is projected to such position as shown in a rectangular region R1 shown by a dotted line for example.

The condition of the pupil position required for the eyepiece optical system 5 of the head-up display device 30 will be explained using FIG. 15 and FIG. 16.

Figure 15A:
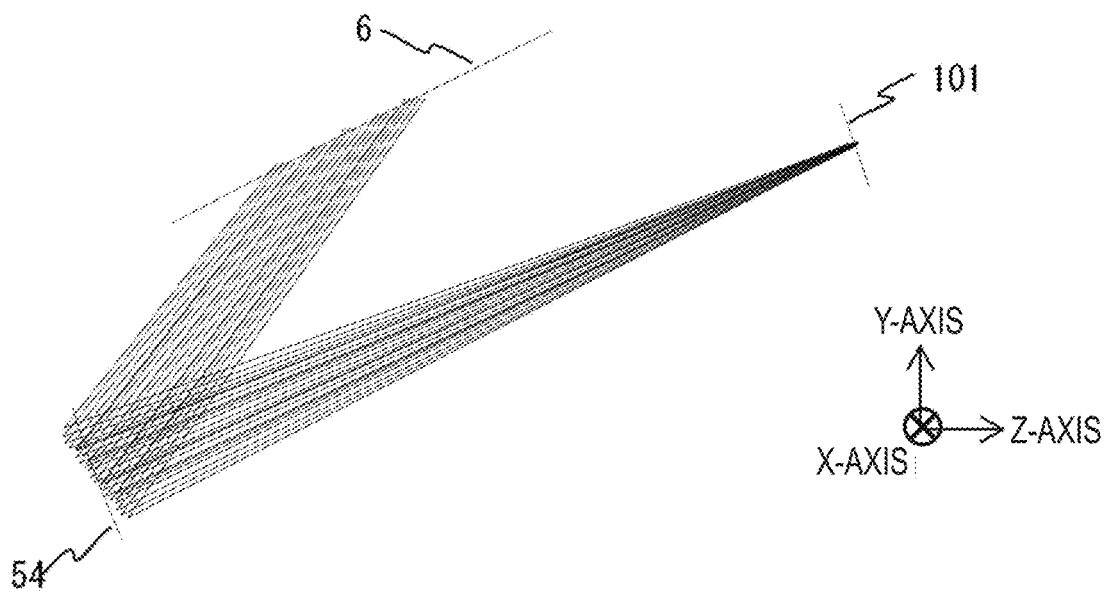
FIG. 15A is a ray diagram obtained by projecting a ray from a windshield to a focus position of the light flux (exit pupil position) to the YZ cross section.
Figure 15B:
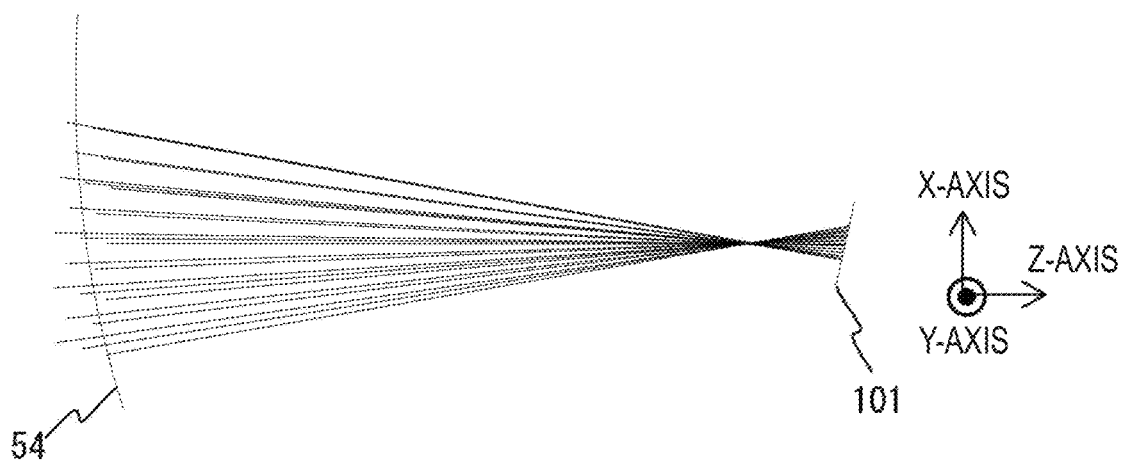
FIG. 15B is a ray diagram obtained by projecting a ray from a free curved surface concave mirror to the focus position of the light flux (exit pupil position) to the XZ cross section.

FIG. 15 is a ray diagram that displays the eyepiece optical system 5 by a reduced optical system of a case of being configured of the windshield 6 and a free curved surface concave mirror 54 (the free curved surface concave mirror is equivalent to a convex lens) which are a requisite minimum configuration. Although the liquid crystal display panel 2 is disposed within the head-up display device 30 in fact as shown in FIG. 20, each drawing of FIG. 15A and FIG. 15B illustrates a state of a ray of only the main ray in a state of omitting illustration of the liquid crystal display panel for facilitating explanation of an exit pupil position 101 in the reduced optical system where the virtual image plane side is made an object, making the pupil diameter 0.001 mm, and being configured of only the windshield 6 and the free curved surface concave mirror 54.

The coordination system of FIG. 15A and FIG. 15B is defined that the horizontal direction of the eye box 8 is X-axis, the vertical direction is Y-axis, and the direction perpendicular to XY-plane is Z-axis.

FIG. 15A is a ray diagram obtained by projecting a ray from the windshield 6 to the focus position 101 (exit pupil position) of the light flux to the YZ cross section, and FIG. 15B is a ray diagram obtained by projecting a ray from the free curved surface concave mirror 54 to the focus position 101 (exit pupil position) of the light flux to the XZ cross section.

In order to make the head-up display device 30 compact, it is preferable to dispose the liquid crystal display panel at a position nearest possible to the free curved surface concave mirror 54 in the position avoiding the optical path from the windshield 6 to the free curved surface concave mirror 54. Therefore, in the reduced optical system where the virtual image plane of FIG. 15A and FIG. 15B is made an object, the exit pupil of the eyepiece optical system 5 comes to be positioned at a location after passing through the liquid crystal display panel.

In the meantime, in the ordinary combination of the liquid crystal display panel 2 and the backlight 1, the incident/emitting side of the liquid crystal display panel is made telecentric.

Here, in order to satisfy this telecentric property (the exit pupil distance is infinitely great) on the liquid crystal display panel side of FIG. 15A and FIG. 15B, it is required to dispose a concave lens having a negative refraction power immediately before the liquid crystal display panel as a field lens.

Figure 16A:
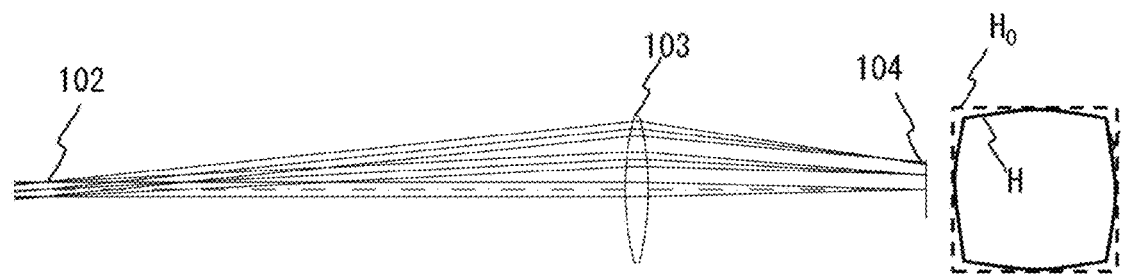
FIG. 16A is a ray tracking diagram of a case where a diaphragm is disposed to be apart from a convex lens by equal to or greater than a focal point distance of a convex lens (equivalent to the free curved surface concave mirror).

The action of this field lens and the action of the free curved surface lens will be explained using FIG. 16A to FIG. 16C. FIG. 16A is a ray tracking diagram of a case where a diaphragm is disposed to be apart from a convex lens by equal to or greater than a focal point distance of the convex lens (equivalent to a free curved surface concave mirror). A diaphragm 102 is disposed to be apart from a convex lens 103 by equal to or greater than the focal point distance of the convex lens 103 (equivalent to the free curved surface concave mirror 54), the main ray that passes through the center of the diaphragm 102 receives a large refraction power at the convex lens 103, and the main ray converges and is made incident to an image plane 104. At the same time, because the ray height H of the actual ray becomes lower than the height $H_0$ of the paraxial ray at the image plane 104 because of the aberration occurring at the convex lens 103, distortion of a barrel shape occurs at the image plane 104.

Figure 16B:
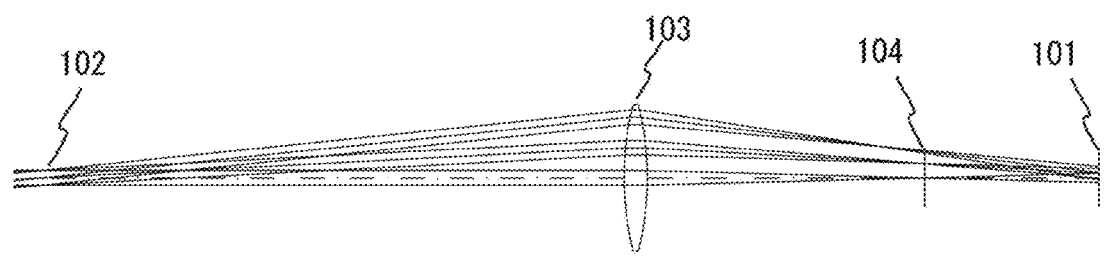
FIG. 16B is a ray tracking diagram that displays up to a position beyond the image plane in order to display the focus position.

FIG. 16B is a ray tracking diagram that displays up to a position beyond the image plane 104 in order to display the focus position 101, and it can be confirmed that the telecentric property has deteriorated.

Figure 16C:
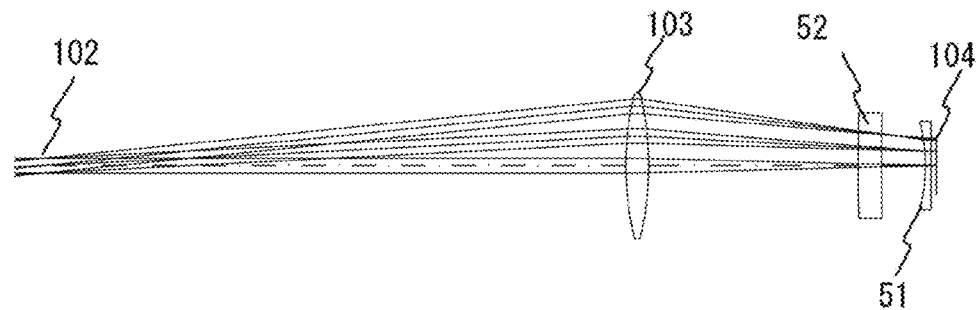
FIG. 16C is a ray tracking diagram of a case of using a basic configuration for correcting the telecentric property and the distortion.

FIG. 16C is a ray tracking diagram of a case of using a basic configuration for correcting the telecentric property and the distortion. Improvement of mainly the telecentric property is achieved by disposing a concave lens 51 immediately before the image plane 104, the concave lens 51 having a focal point distance that is equivalent to the distance between the image plane 104 and the focus position 101 of FIG. 16B, and mainly the distortion is corrected by bringing the ray height H of the actual ray at the image plane 104 close to the ray height $H_0$ of the paraxial ray by a free curved surface lens 52 that is disposed before the concave lens 51.

Here, although it is possible to omit the concave lens 51 by providing the free curved surface lens 52 itself with a negative refraction power, the surface inclination of the lens surface of the free curved surface lens 52 becomes large. Therefore, by separation into the free curved surface lens 52 and the concave lens 51, productivity of the free curved surface lens 52 improves, and difference of the position of the free curved surface lens 52 and the position of the concave lens 51, namely difference in the ray height, namely the degree of freedom is effective in correction of the telecentric property and the distortion.

Although detailed definition expression will be explained below, because the definition expression of the free curved surface lens 52 includes an XY polynomial expression, it is possible to provide a horizontally asymmetric and vertically asymmetric lens action, and it is also effective for correction of horizontally asymmetric and vertically asymmetric distortion property occurring in the windshield 6.

Also, it is preferable to dispose the concave lens 51 so as to oppose the light irradiation surface of the liquid crystal display panel 2 (refer to FIG. 20) and to minimize the distance to the light irradiation surface (contacts the light irradiation surface when the distance is 0). Therefore, in the concave lens 51, the surface opposing the light irradiation surface of the liquid crystal display panel (will be hereinafter referred to as an "opposing surface") is formed into a flat shape. Thus, it becomes easy to dispose the entire surface of the opposing surface closer to the liquid crystal display panel compared to a case where the opposing surface of the concave lens 51 is formed into a concave surface. At that time, by attaching the concave lens 51 to the liquid crystal display panel 2 through a holding member 25 (refer to FIG. 9), it becomes easy to dispose the concave lens 51 more closer to the liquid crystal display panel 2.

Also, when the opposing surface of the concave lens 51 is formed into a concave surface, because the end part of the concave surface becomes closer to the liquid crystal display panel 2 compared to the center part of the concave surface, the necessity of disposing the concave lens 51 itself to be apart from the liquid crystal display panel 2 occurs. Further, because the range where the pixels can be displayed in the liquid crystal display panel 2 is larger than the effective size of the image light in the liquid crystal display panel 2 and structures exist outside the range also, disposal of the concave lens 51 to be apart from the liquid crystal display panel 2 becomes increasingly necessary in order to avoid structural interference with the concave lens 51 taking the structures into consideration. Based on the fact, it is assumed that the opposing surface with the liquid crystal display panel 2 in the concave lens 51 is formed preferably into a flat surface instead of a concave surface.

Also, it is preferable that the concave lens 51 has such optical property satisfying a condition that a value obtained by dividing the focal point distance of the concave lens 51 by the focal point distance of the free curved surface concave mirror 54 is equal to or greater than −0.6 and equal to or smaller than −0.3.

The meaning of the condition will be explained using FIG. 15 that displays ray tracking in the reduced optical system. When the refraction power of the free curved surface concave mirror 54 (=inverse number of the focal point distance) is strong, the focus position of the light flux reflected by the free curved surface concave mirror 54 becomes close to the free curved surface concave mirror 54. To the contrary, when the refraction power of the free curved surface concave mirror 54 is weak, the focus position of the light flux reflected by the free curved surface concave mirror 54 becomes apart from the free curved surface concave mirror 54. Also, with respect to the concave lens 51 for achieving a telecentric state of the light flux, when the refraction power of the free curved surface concave mirror 54 is strong, it is required to strengthen the refraction power (a negative value) of the concave lens 51 also. To the contrary, when the refraction power of the free curved surface concave mirror 54 is weak, it is required to weaken the refraction power of the concave lens 51 also. Accordingly, the main ray at the liquid crystal display panel 2 becomes a converged state when the ratio of the focal point distance is less than −0.6, and the main ray at the liquid crystal display panel 2 becomes a diverged state when the ratio of the focal point distance is larger than −0.3.

Also, the inverse number of the focal point distance is the refraction power, a strong refraction power means that the absolute value of the inverse number is large, and, to the contrary, a weak refraction power means that the absolute value of the inverse number is small.

Next, the first embodiment of the projection optical system using the free curved surface concave mirror 54, the free curved surface lens 52, and the concave lens 51 capable of achieving the head-up display device 30 of a compact type will be explained.

First Embodiment

Figure 1A:
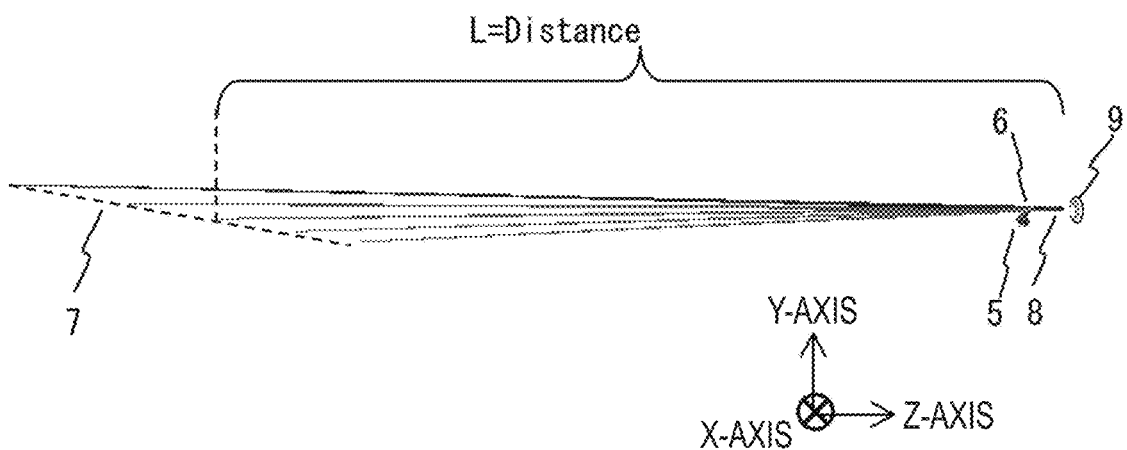
FIG. 1A is a total ray diagram of an eyepiece optical system of the first embodiment (YZ plane).

The first embodiment has a feature in the configuration of the eyepiece optical system 5 out of the head-up display device 30 of FIG. 17. The windshield 6 and the eyepiece optical system 5 configuring the projection optical system will be explained referring to FIG. 1. FIG. 1A is a total ray diagram of the eyepiece optical system 5 of the first embodiment, and shows a situation of viewing image information of the virtual image plane 7 with the eyes of the viewer in YZ plane defined by the horizontal direction X-axis of the eye box 8, the vertical direction Y-axis, and Z-axis perpendicular to XY-axis. Also, FIG. 1B is a total ray diagram of the eyepiece optical system 5 of the first embodiment, and shows a situation of viewing the image information of the virtual image plane 7 with the eyes of the viewer in XZ plane.

Figure 1B:
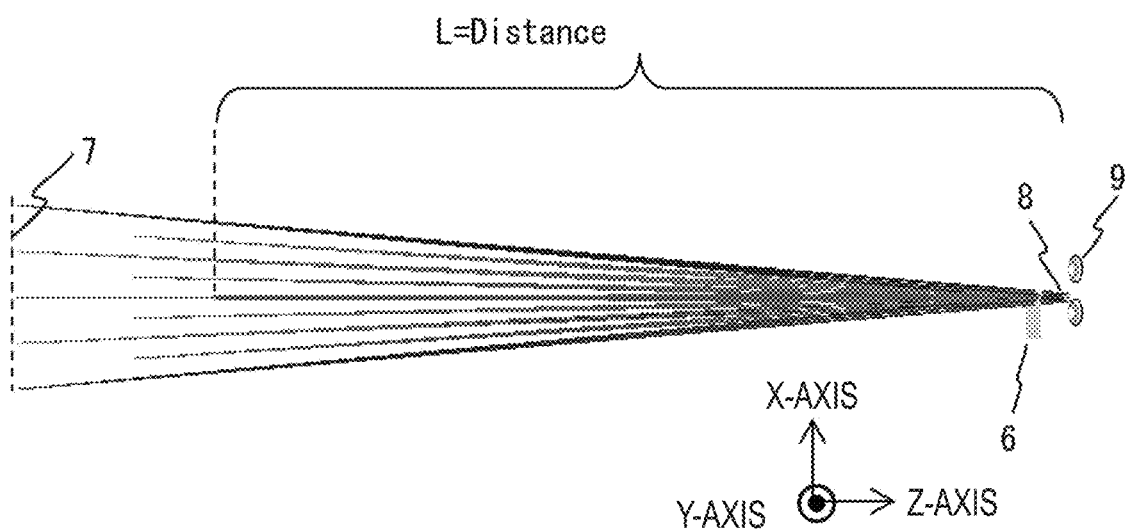
FIG. 1B is a total ray diagram of the eyepiece optical system of the first embodiment (XZ plane).

The right eye and the left eye overlap in YZ plane (refer to the reference sign 9 of FIG. 1A), and the right eye and the left eye are seen separately in XZ plane (refer to the reference sign 9 of FIG. 1B). As shown in FIG. 1A, the virtual image plane 7 is disposed so as to be tilted with respect to the field of view direction. To be more specific, the virtual image distance is increased on the upper side of the field of view (the positive side of Y-coordinate), and the virtual image distance is reduced on the lower side of the field of view (the negative side of Y-coordinate). Since the windshield 6 has a symmetric shape with respect to the right-left direction of an automobile, the range of the windshield 6 where the effective light flux passes through in the head-up display device 30 is displayed symmetrically in the right-left direction.

Figure 2:
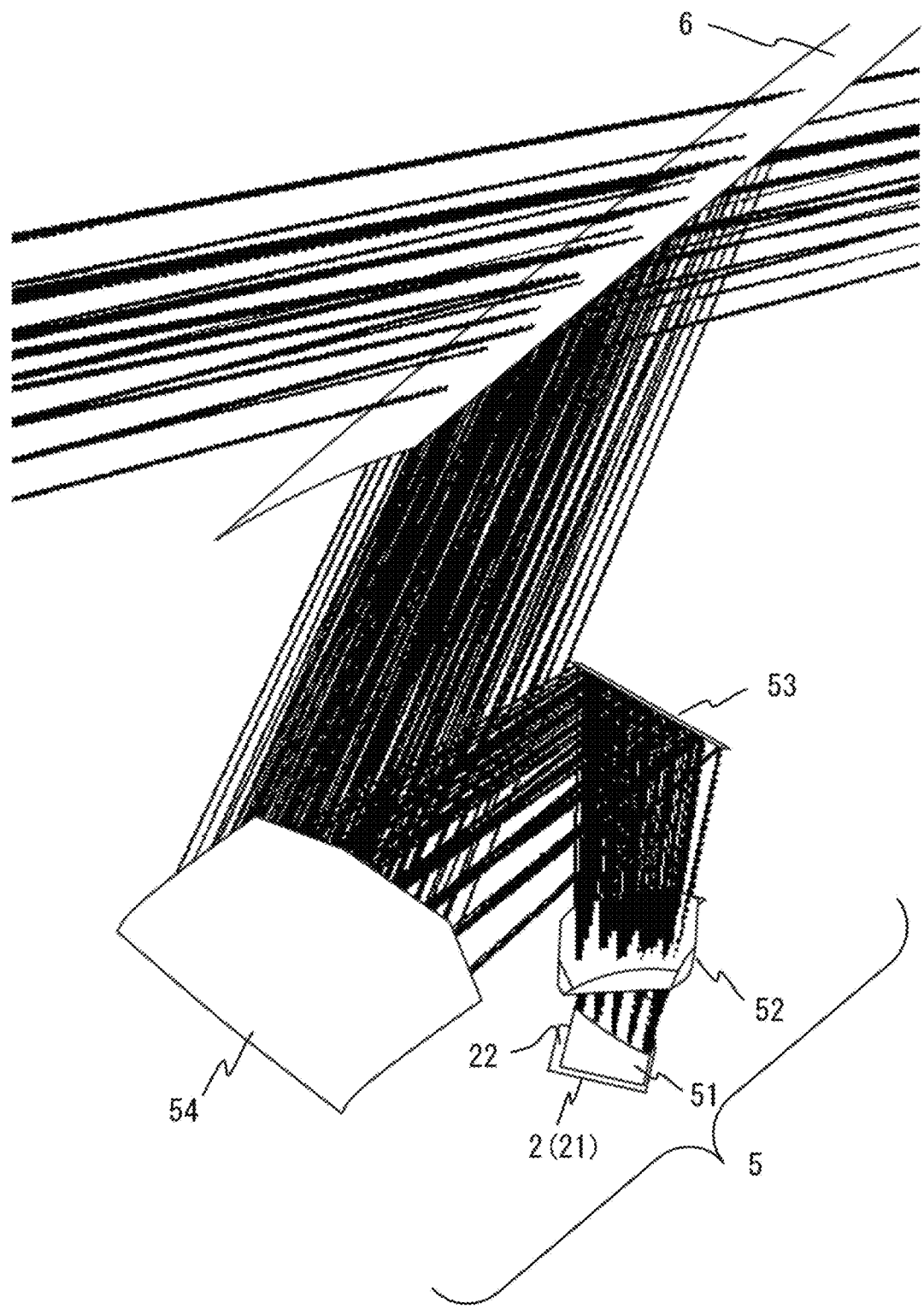
FIG. 2 is an enlarged view of an essential part of the eyepiece optical system of the first embodiment.

FIG. 2 is an enlarged view of an essential part of the eyepiece optical system of the first embodiment. As shown in FIG. 2, the eyepiece optical system 5 is configured by disposing the concave lens 51, the free curved surface lens 52, a reflecting mirror 53, the free curved surface concave mirror 54 having a positive refraction power, and the windshield 6 which are arrayed in order from a polarization plate 21 (a component of the liquid crystal display panel 2) side. The concave lens 51 is disposed to oppose an emission surface 22 of the image light of the liquid crystal display panel 2. The refraction power of the eyepiece optical system 5 is mainly borne by the free curved surface concave mirror 54. Telecentric property is achieved mainly by the concave lens 51, and distortion is corrected mainly by the free curved surface lens 52. It is known that compactization of the head-up display device 30 has been achieved by that the reflecting mirror 53 is positioned below an optical path along which a light flux reflected by the windshield 6 is headed to the free curved surface concave mirror 54, and by that the free curved surface lens 52 is positioned below the optical path.

FIG. 3 is a drawing that shows lens data of the head-up display device 30 according to the first embodiment. In the lens data shown in FIG. 3, the radius of curvature is expressed by a positive mark when the center position of the radius of curvature is positioned in the proceeding direction, and the interplanar distance expresses the distance on the optical axis from the apex position of each surface to the apex position of the next surface.

As shown in FIG. 3, the first interplanar distance d1 (refer to FIG. 9) from the emission surface 22 (equivalent to the surface 12 of FIG. 3) of the image light in the liquid crystal display panel 2 to an opposing surface 51a (refer to FIG. 9; equivalent to surface 11 of FIG. 3) that opposes the liquid crystal display panel 2 in the concave lens 51 is 0.122, the second interplanar distance d2 (refer to FIG. 9) from the opposing surface to an emission surface 51b (refer to FIG. 9; equivalent to surface 10 of FIG. 3) where the image light made to be incident to the concave lens 51 is emitted from the concave lens 51 is 4.700, and therefore the first interplanar distance d1 is shorter than the second interplanar distance d2. That is, the concave lens 51 is disposed so as to be closer to the liquid crystal display panel 2 than the thickness of the concave lens 51. It is preferable that the first interplanar distance d1 is as small as possible, namely the concave lens 51 is preferable to be located as close as possible to the liquid crystal display panel 2, and the concave lens 51 comes to be disposed so as to contact the liquid crystal display panel 2 in the case of d1=0.

Decentering is a value of each of X-axis direction/Y-axis direction/Z-axis direction, and tilting is rotation around X-axis/rotation around Y-axis/rotation around Z-axis. With respect to decentering/tilting, decentering and tilting are applied to the surface in question in order. In "normal decentering", at the position of the interplanar distance on a new coordinate system to which decentering/tilting has been applied, the next surface is disposed. Decentering and tilting of "decenter & return" are applied only to the surface in question, and do not affect the next surface. Also, rotation around X-axis is positive for the clockwise direction as viewed from the positive direction of X-axis, rotation around Y-axis is positive for the clockwise direction as viewed from the positive direction of Y-axis, and rotation around Z-axis is positive for the counterclockwise direction as viewed from the positive direction of Z-axis.

Glass material name 50.30 expresses material having the refraction index of 1.50 and the Abbe number of 30, and glass material name 52.60 expresses material having the refraction index of 1.52 and the Abbe number of 60.

Surface 2 (the windshield 6) is an anamorphic aspherical surface, and can be obtained by the formula (1) below using the radius of curvature 9,686 mm (=1/cuy) of Y-direction and the radius of curvature 5,531 mm (=1/cux) of X-direction.

[Formula 1]

$$Z = \frac{cux \cdot x^2 + cuy \cdot y^2}{1 + \sqrt{1 - (1 + Kx)cux^2 \cdot x^2 - (1 + Ky)cuy^2 \cdot y^2}} \quad (1)$$

FIG. 4 is a drawing of free curved surface factors of the head-up display device 30 according to the first embodiment. The free curved surface factors of FIG. 4 are obtained by the formula (2) below.

[Formula 2]

$$Z = \frac{c \cdot (x^2 + y^2)}{1 + \sqrt{1 - (1 + K)c^2 \cdot (x^2 + y^2)}} + \sum\sum (Cj(m, n) \times x^m \times y^n) \quad (2)$$

wherein $j = [(m + n)^2 + m + 3n]/2 + 1$

The free curved surface factor $C_j$ represents a shape that is rotationally asymmetric with respect to each optical axis (Z-axis), and represents a shape that is defined by the component of the conic term and the component of the XY polynomial expression term. For example, when X is 2-dimensional (m=2) and Y is 3-dimensional (n=3), the factor of $C_{19}$ where $j=[(2+3)^2+2+3\times3]/2+1=19$ corresponds.

Also, the position of the optical axis of each of the free curved surface is determined by the quantity of decentering/tilting in the lens data of FIG. 3.

Hereinafter, values of the eye box size, the field of view angle, and the like of the eyepiece optical system of the first embodiment will be shown in order of the horizontal direction and the vertical direction.

| | |
|---|---|
| Eye box size | 130 × 40 mm |
| Effective size of image light in liquid crystal display panel | 67.4 × 29.0 mm |
| Field of view angle (all field angle) | 10 × 4 degrees |
| Depression angle | 0.7 degree |
| Virtual image distance | 16.5 m (depression angle direction) |

The value obtained by dividing the focal point distance of the concave lens (−143 mm) by the focal point distance of the free curved surface concave mirror (355 mm) is −0.40.

Next, the optical performance of the first embodiment will be explained using FIG. 5A to FIG. 5E, FIG. 6, FIG. 7A, and FIG. 7B.

Each drawing of FIG. 5A to FIG. 5E is the drawing that shows the distortion property of the head-up display device

Figure 5A:
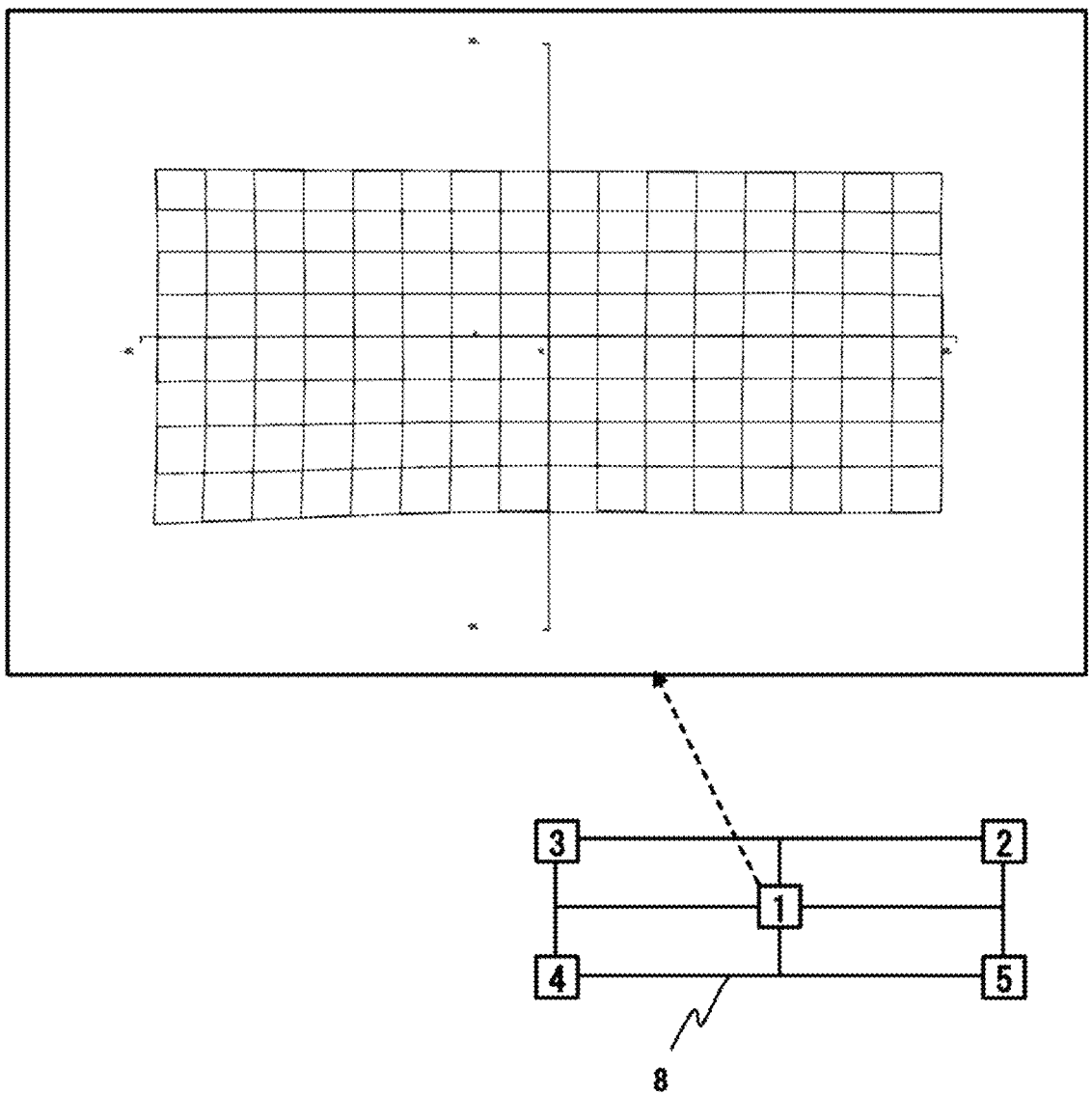
FIG. 5A is a drawing that shows the distortion property as viewed from the center of an eye box in the first embodiment.
Figure 5B:
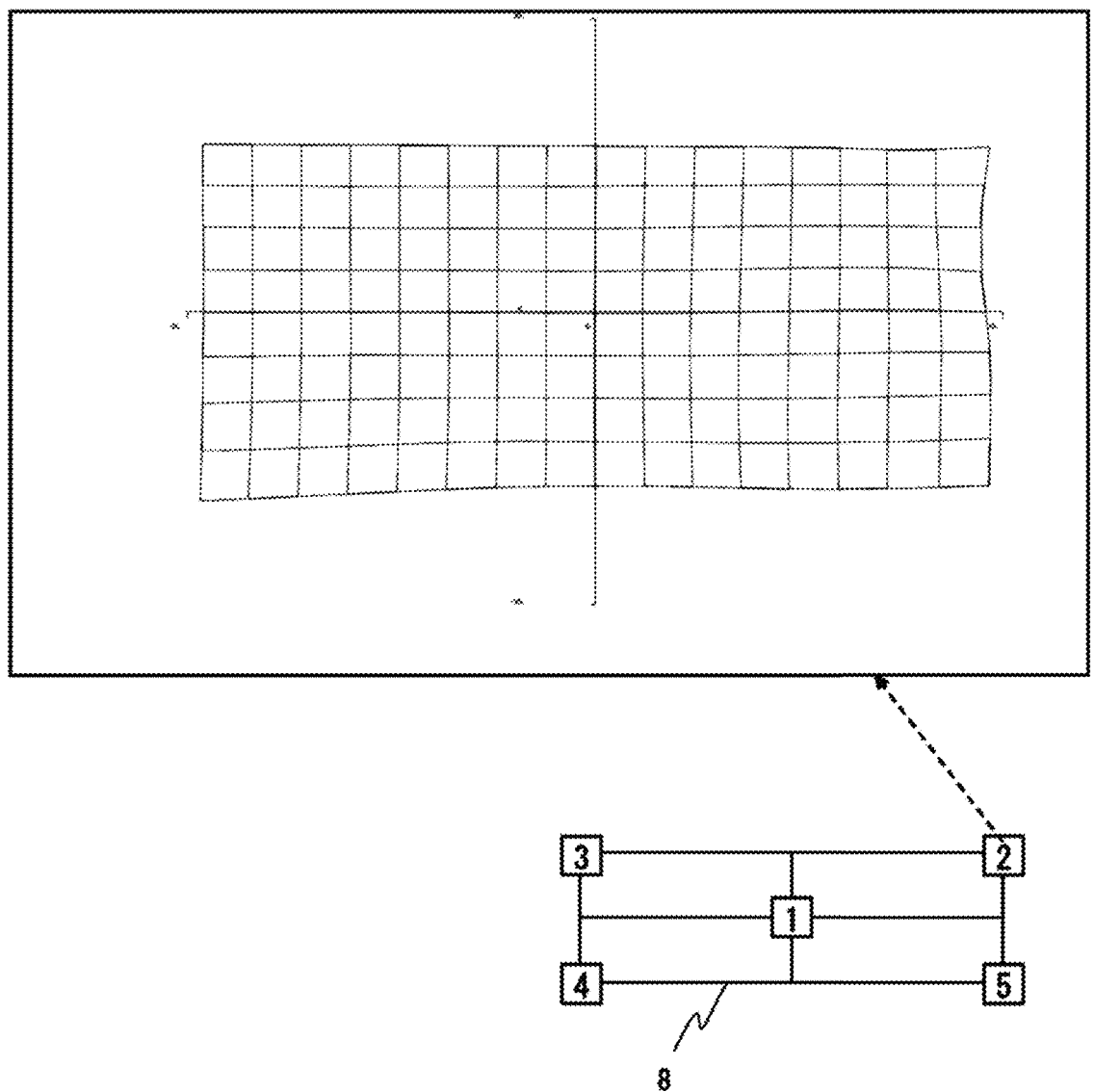
FIG. 5B is a drawing that shows the distortion property as viewed from the top right of the eye box in the first embodiment.
Figure 5C:
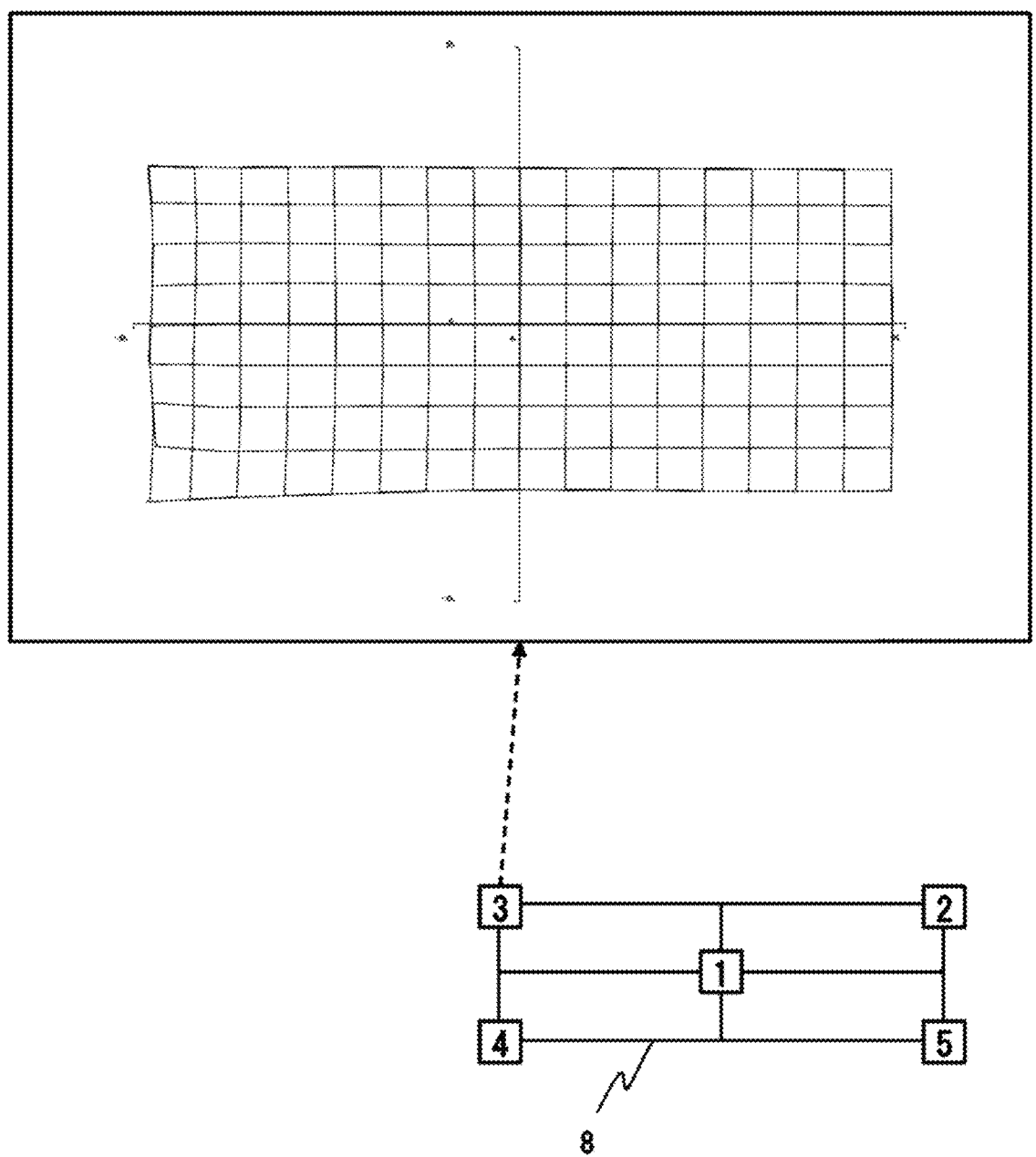
FIG. 5C is a drawing that shows the distortion property as viewed from the top left of the eye box in the first embodiment.

30 of the first embodiment. To be more specific, FIG. 5A is a distortion diagram on the liquid crystal display panel 2 side by a ray that passes through the center of the eye box 8 with respect to the range of the virtual image plane 7 having a rectangular shape. FIG. 5B, FIG. 5C, FIG. 5D, and FIG. 5E are distortion diagrams on the liquid crystal display panel 2 side by a ray that passes through each point of the top right corner, the top left corner, the bottom left corner, and the bottom right corner of the eye box 8.

When the eye is positioned at each position within the eye box 8 in a state where a rectangular image is displayed on the liquid crystal display panel 2 side, distortion opposite to that of FIG. 5A to FIG. 5E (example: barrel type↔bobbin type) is observed. Since the distortion diagrams of FIG. 5A to FIG. 5E have a generally same shape, when an image matching the distortion diagram of FIG. 5A to FIG. 5E for example is displayed on the liquid crystal display panel 2, the viewer can observe a rectangular virtual image that has no distortion.

Figure 6:
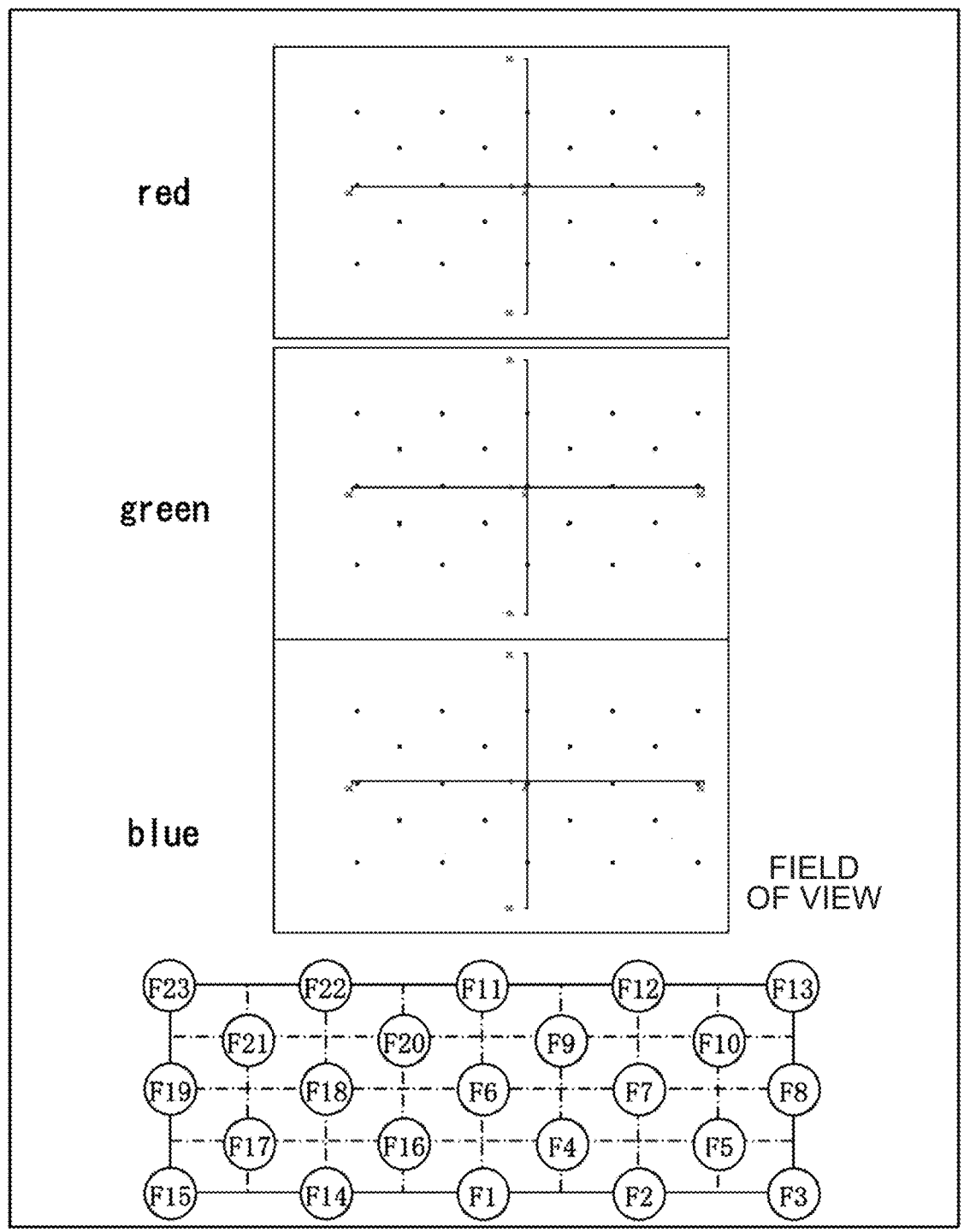
FIG. 6 is a spot diagram on a liquid crystal display panel when an object point is disposed on a virtual image plane.

FIG. 6 is a spot diagram of the head-up display device 30 of the first embodiment. FIG. 6 is a spot diagram on the liquid crystal display panel 2 of a case where an object point is disposed on a virtual image plane, and is a drawing that displays a spot diagram by a ray that passes through the entire eye box 8 separately by red color (650 nm), green color (550 nm), and blue color (450 nm). This spot diagram is a spot diagram for all light fluxes of the eye box 8 having the size of 130 mm horizontal×40 mm vertical. In a case of the virtual image viewed by the actual viewer, the spot diagram in the size of the iris of the eye of a human body (said to be 7 mm in diameter at a maximum) has been improved enormously. Here, the spot diagram is a drawing where a spot diagram at each position of the liquid crystal display panel 2 in the reduced optical system with the virtual image being made the object surface is enlarged and highlighted by 5 times.

Figure 7A:
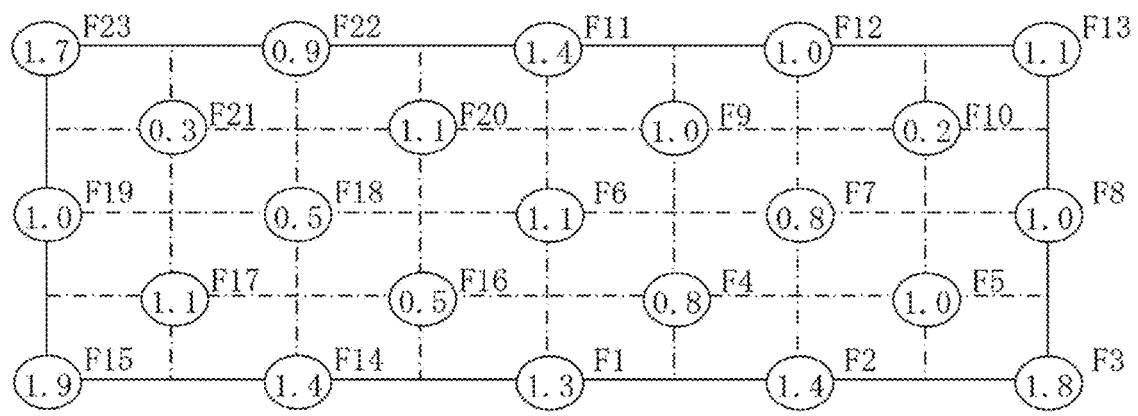
FIG. 7A is an angle shift diagram of a main ray Ray 1 and an imaginal ray Ray 0 at each field angle position.
Figure 7B:
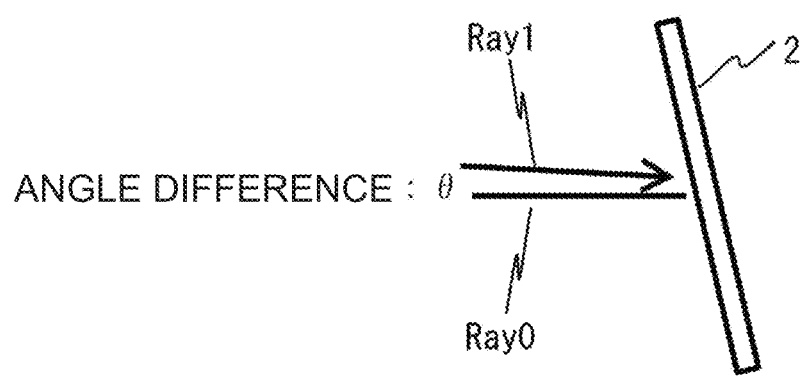
FIG. 7B is a drawing that shows the angle θ between the main ray Ray 1 and the imaginal ray Ray 0.

FIG. 7A is an angle shift diagram of the main ray Ray 1 and the imaginal ray Ray 0 at each field angle position. Also, FIG. 7B is a drawing that shows the angle θ between the main ray Ray 1 and the imaginal ray Ray 0. As shown in FIG. 7B, the imaginal ray Ray 0 is a straight line obtained by rotating the normal line of the liquid crystal display panel 2 by 13 degrees around a rotation axis that is parallel to the long side of the liquid crystal display panel 2. That is, it is meant that the illumination optical system is disposed so as to be tilted 13 degrees with respect to the liquid crystal display panel 2. From FIG. 7A, it is known that the maximum value of the angle shift is as less as 1.9 degrees.

Therefore, according to the present embodiment, the head-up display device 30 can be provided which is made compact by a projection optical system using a free curved surface concave mirror, a free curved surface lens, and a concave lens.

Second Embodiment

The second embodiment is featured in that the configuration of the eyepiece optical system 5 is different from that of the first embodiment. The second embodiment is an embodiment where the liquid crystal display panel 2 of a compact type is combined, the reflecting mirror 53 is deleted, and priority is given to compactization of the head-up display device 30.

Figure 8A:
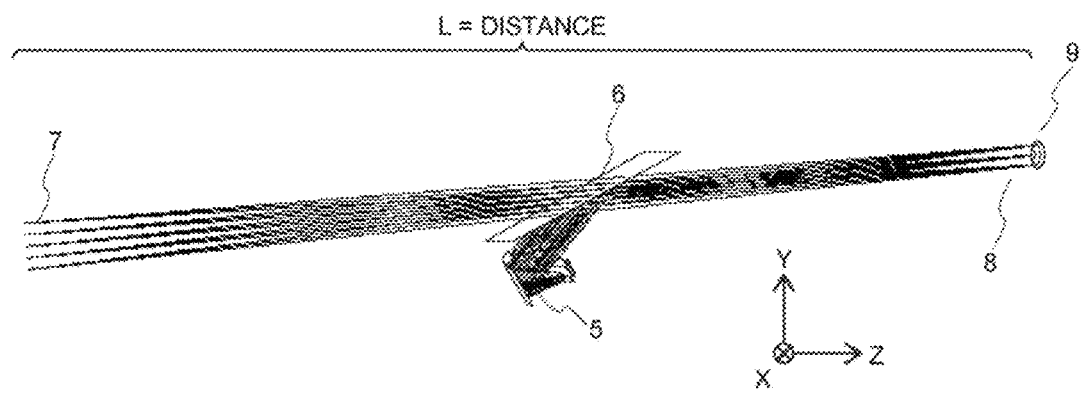
FIG. 8A is a total ray diagram of an eyepiece optical system of the second embodiment (YZ plane).
Figure 8B:
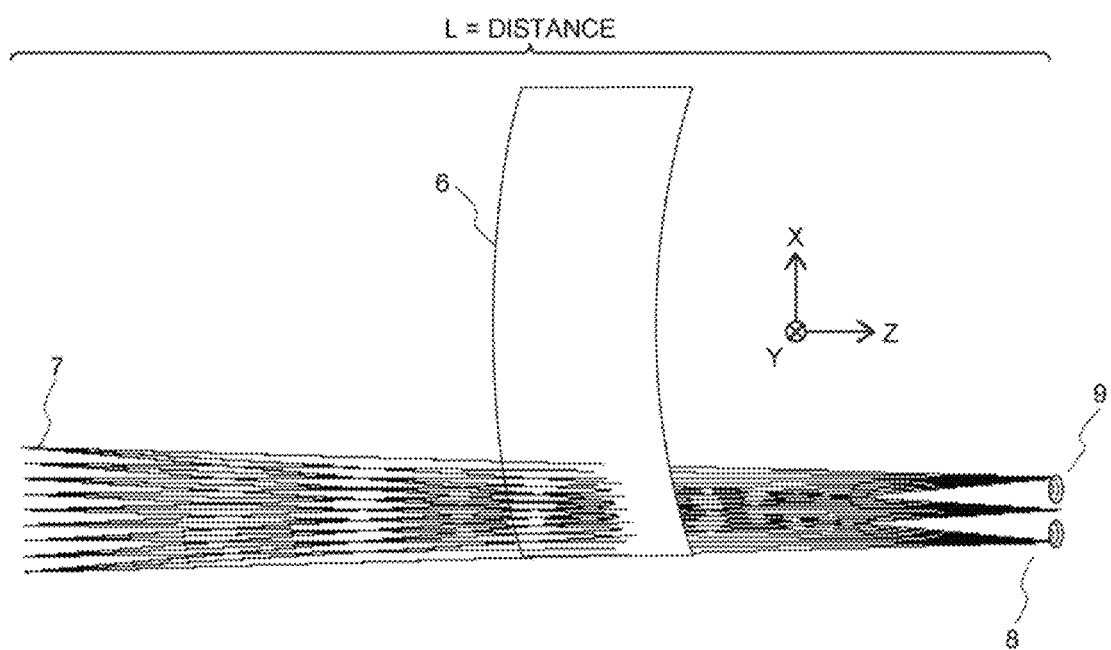
FIG. 8B is a total ray diagram of the eyepiece optical system of the second embodiment (XZ plane).
Figure 9:
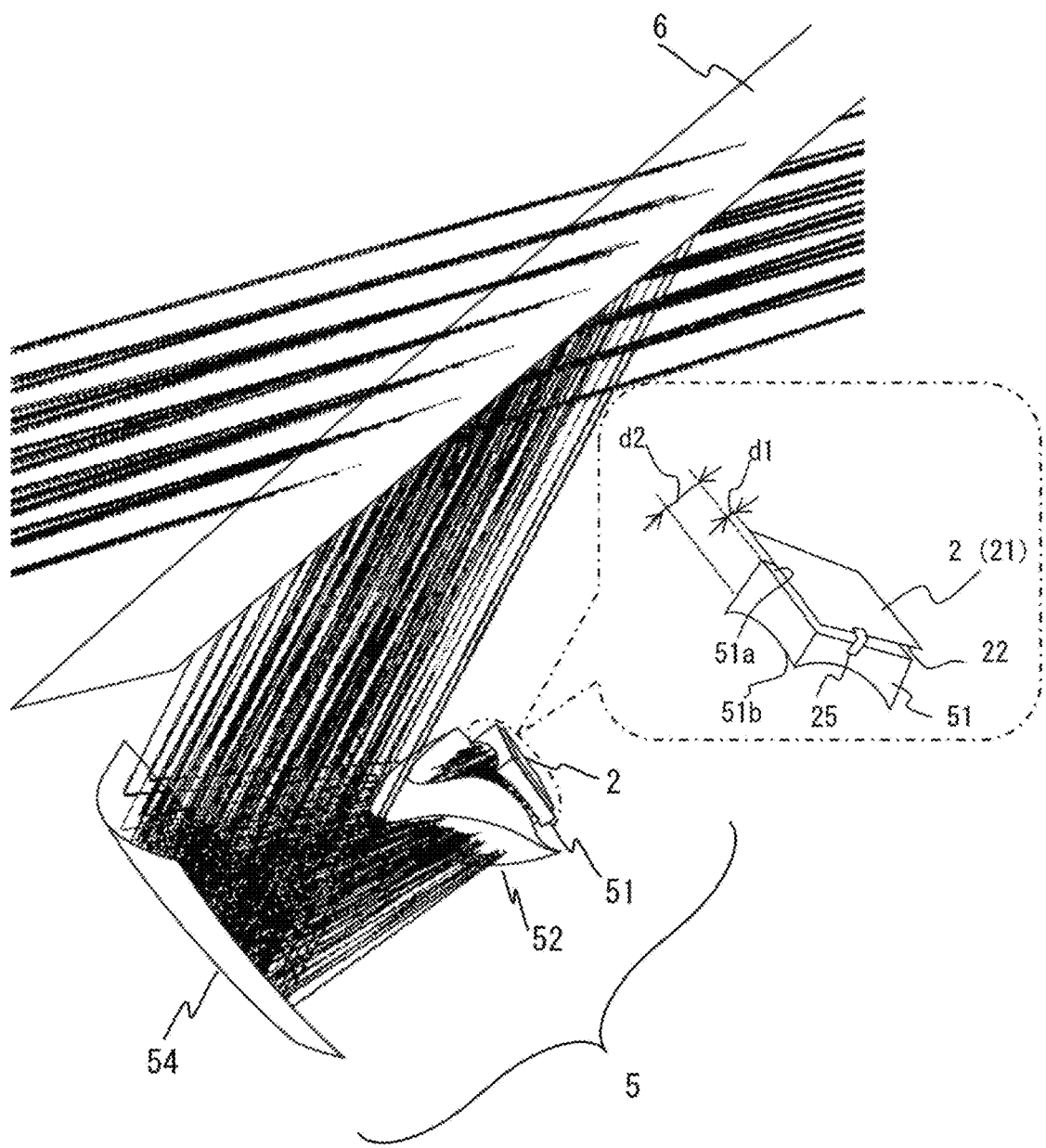
FIG. 9 is an enlarged view of an essential part of the eyepiece optical system of the second embodiment.

FIG. 8A is a total ray diagram of the eyepiece optical system 5 of the second embodiment, and shows a situation of viewing image information of the virtual image plane 7 with the eyes of the viewer in YZ-plane defined by the horizontal direction X-axis, the vertical direction Y-axis, and Z-axis perpendicular to XY-axis of the eye box 8. FIG. 8B shows a situation of viewing the image information of the virtual image plane 7 with the eyes of the viewer in XZ plane. FIG. 9 is an enlarged view of an essential part of the eyepiece optical system of the second embodiment.

As shown in FIG. 8A, FIG. 8B, and FIG. 9, in the eyepiece optical system 5, the concave lens 51, the free curved surface lens 52, and the free curved surface concave mirror 54 having a positive refraction power are disposed in order from a polarization plate 21 (a component of the liquid crystal display panel 2) side, and the windshield 6 is disposed so as to be arrayed next to them.

FIG. 10 is a drawing that shows lens data of the head-up display device 30 according to the second embodiment. FIG. 11 is a drawing of free curved surface factors of the head-up display device 30 according to the second embodiment.

Hereinafter, values of the eye box size, the field of view angle, and the like of the eyepiece optical system of the second embodiment will be shown in order of the horizontal direction and the vertical direction.

| | |
|---|---|
| Eye box size | 130 × 40 mm |
| Effective size of image light in liquid crystal display panel | 39.5 × 20.4 mm |
| Virtual image size | 240 × 90 mm |
| Field of view angle (all field angle) | 6.9 × 2.6 degrees |
| Depression angle | 5.1 degrees |
| Virtual image distance | 2.1 m |

The value obtained by dividing the focal point distance of the concave lens (−90 mm) by the focal point distance of the free curved surface concave mirror (188 mm) is −0.48.

Figure 12A:
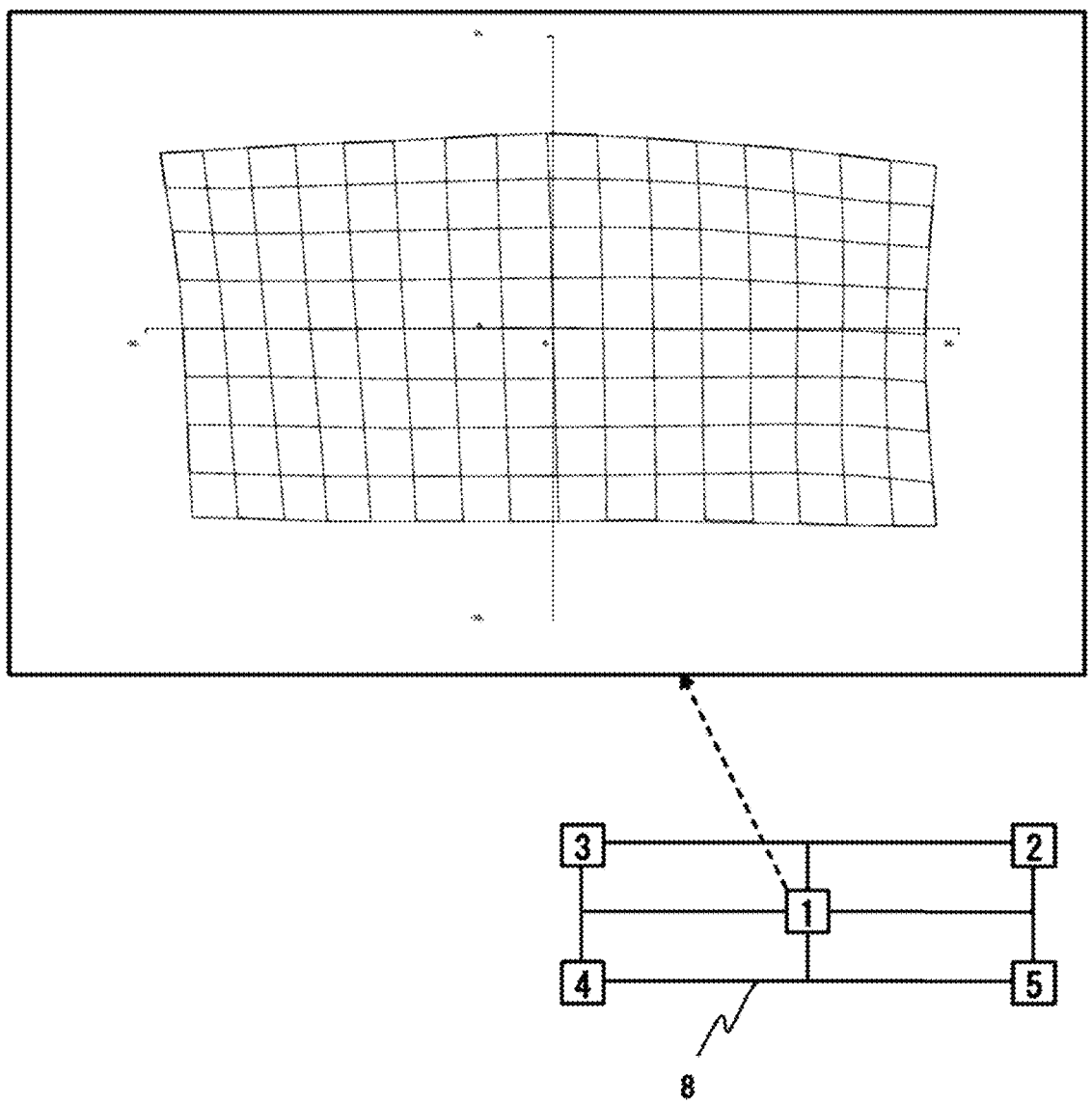
FIG. 12A is a drawing that shows the distortion property as viewed from the center of an eye box in the second embodiment.
Figure 12C:
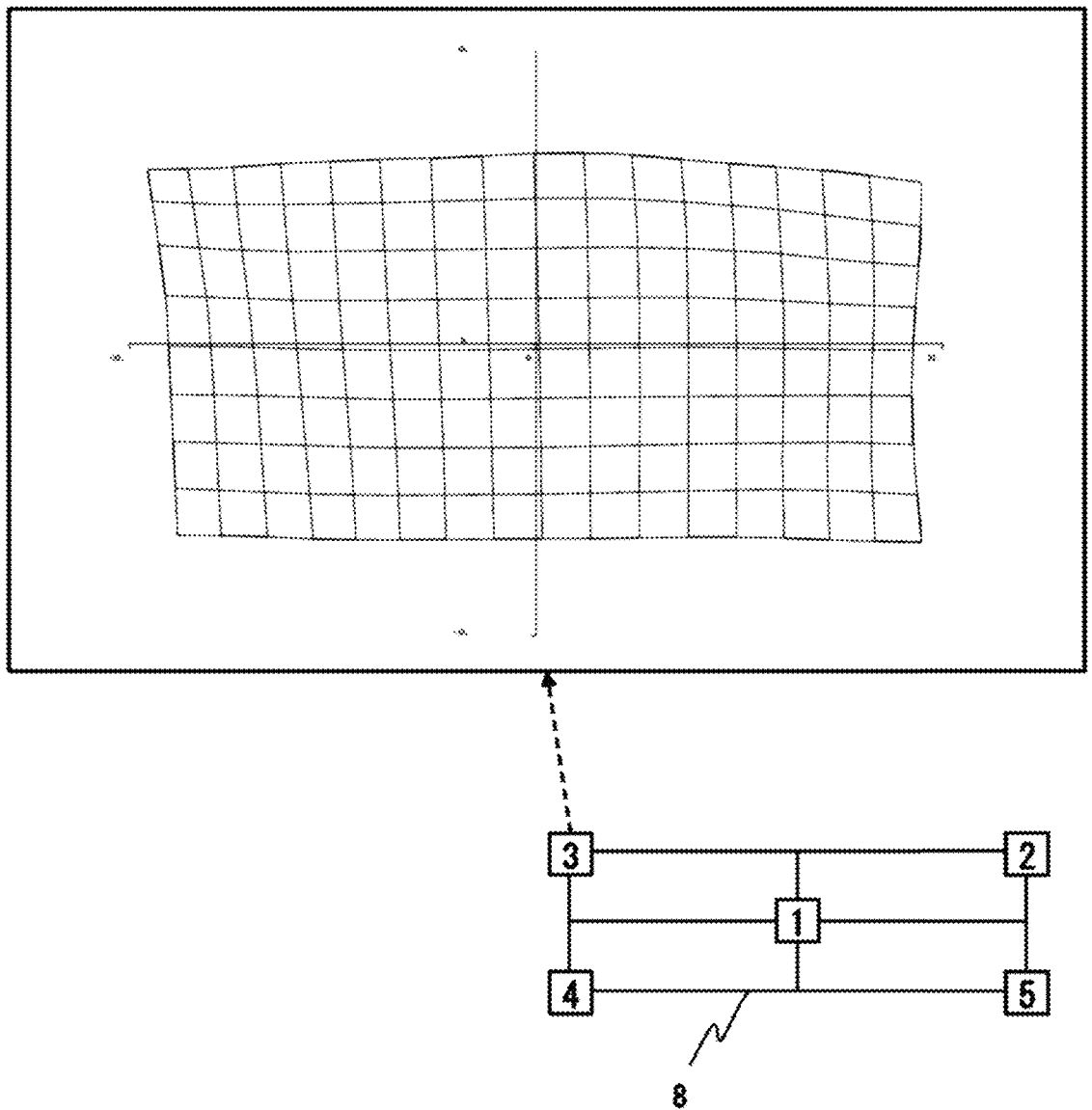
FIG. 12C is a drawing that shows the distortion property as viewed from the top left of the eye box in the second embodiment.
Figure 12D:
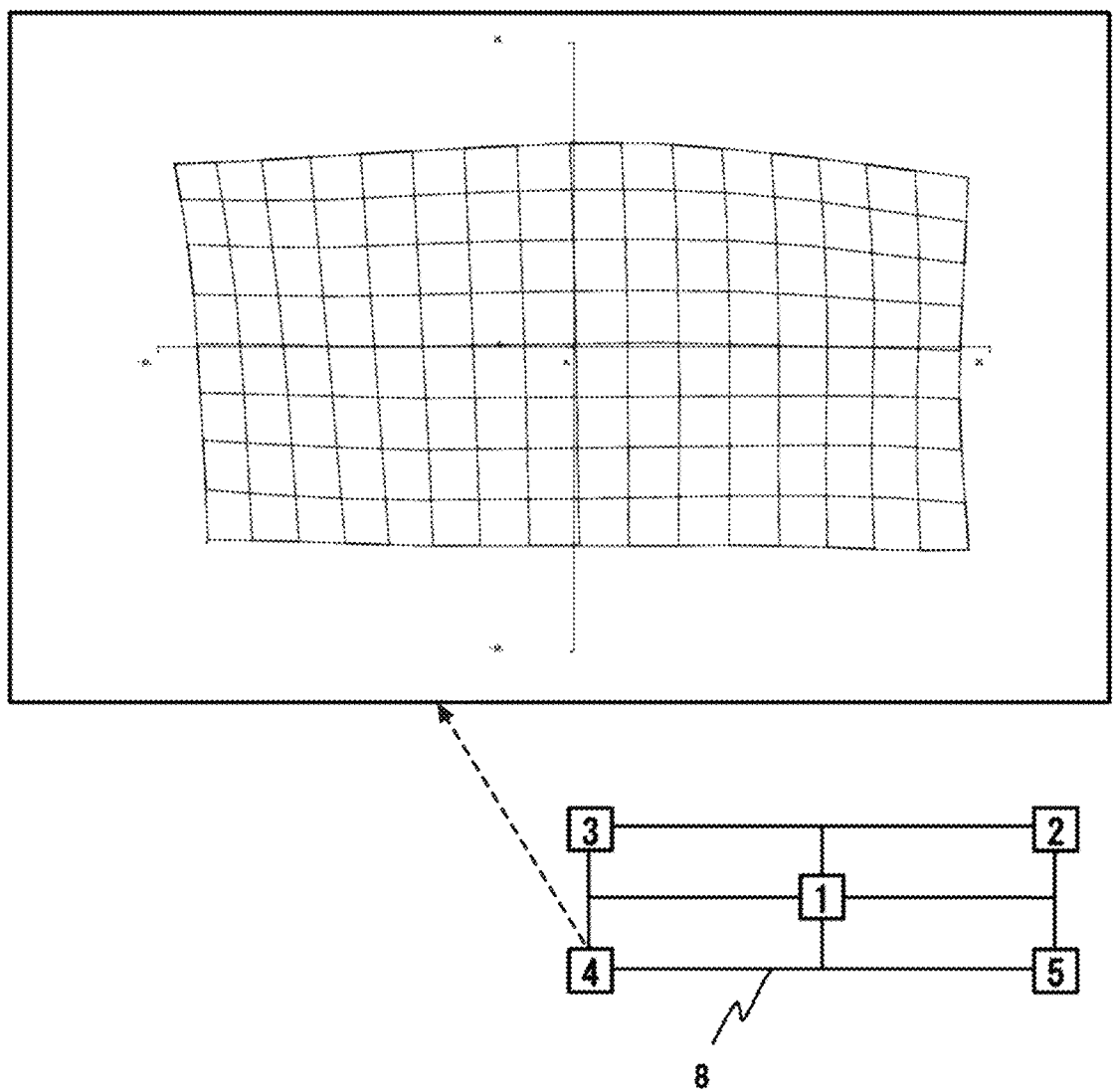
FIG. 12D is a drawing that shows the distortion property as viewed from the bottom left of the eye box in the second embodiment.
Figure 12E:
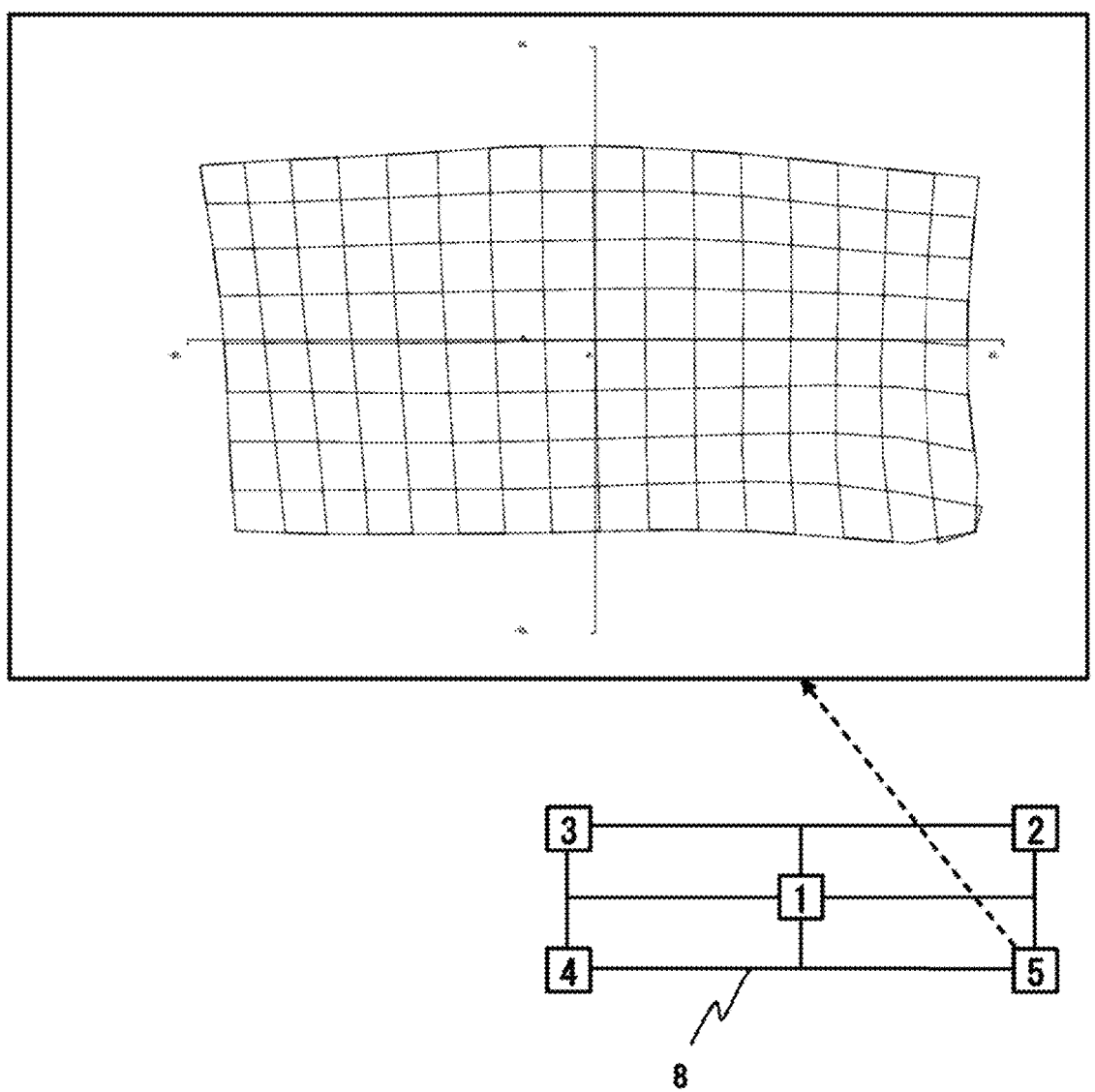
FIG. 12E is a drawing that shows the distortion property as viewed from the bottom right of the eye box in the second embodiment.
Figure 13:
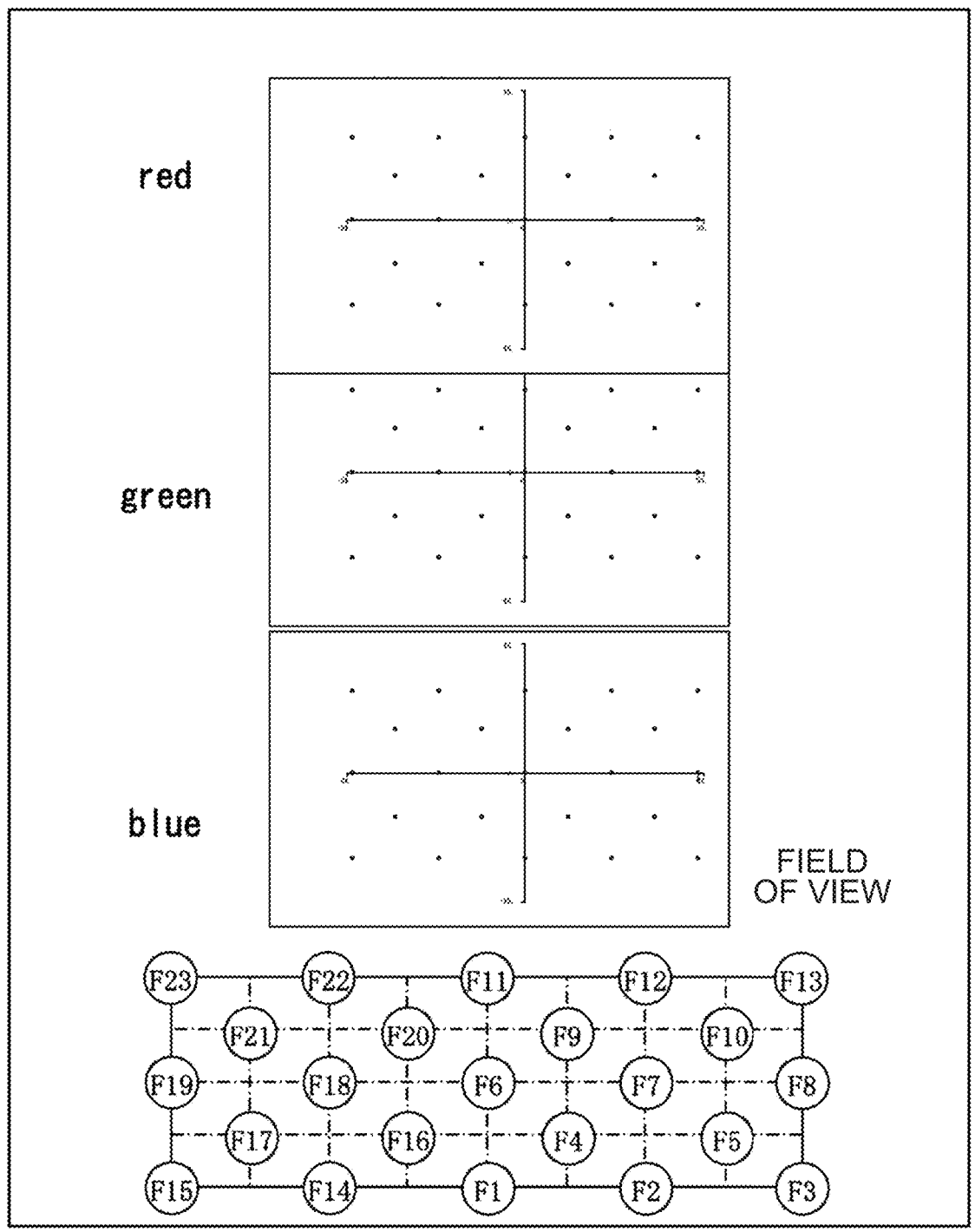
FIG. 13 is a spot diagram of a head-up display device of the second embodiment.
Figure 14A:
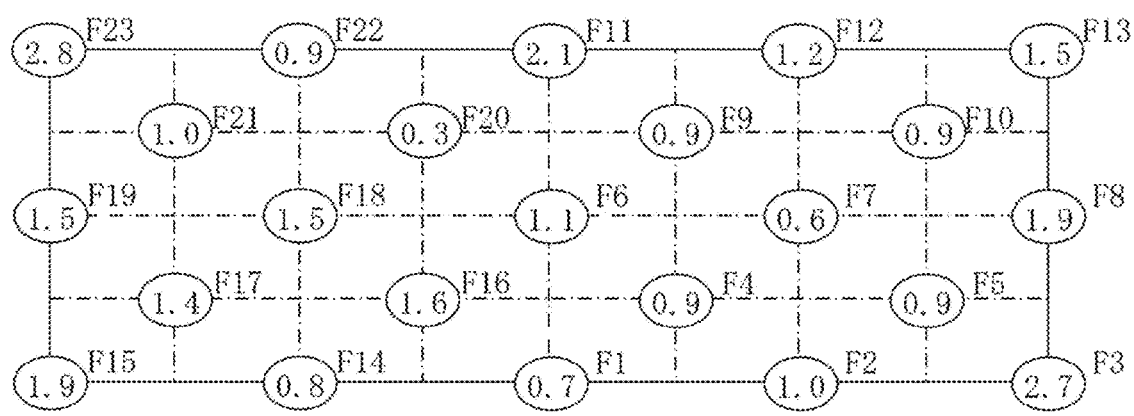
FIG. 14A is an angle shift diagram of a main ray and the normal line of a liquid crystal display panel at each field angle position.
Figure 14B:
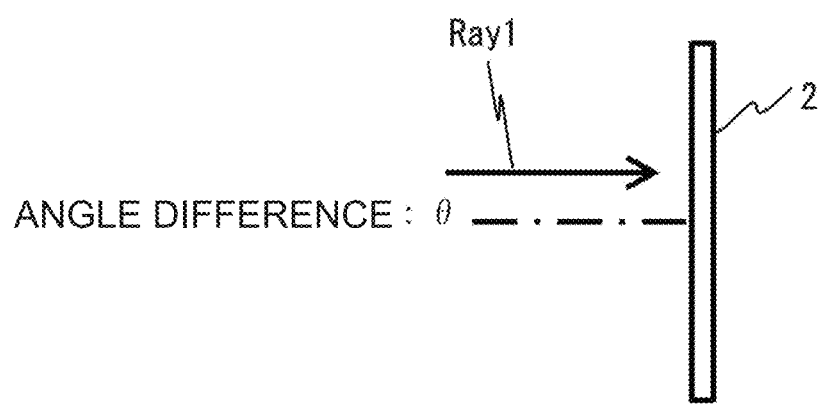
FIG. 14B is a drawing that shows the angle θ between the main ray and the normal line of the liquid crystal display panel.

Next, the optical performance of the second embodiment will be explained using FIG. 12A to FIG. 12E, FIG. 13, FIG. 14A, and FIG. 14B. FIG. 12A to FIG. 12E are drawings that express the distortion property of the head-up display device 30 of the second embodiment. To be more specific, FIG. 12A is a distortion diagram on the liquid crystal display panel 2 side by a ray that passes through the center of the eye box 8 with respect to the range of the virtual image plane 7 having a rectangular shape. FIG. 12B, FIG. 12C, FIG. 12D, and FIG. 12E are distortion diagrams on the liquid crystal display panel 2 side by a ray that passes through each point of the top right corner, the top left corner, the bottom left corner, and the bottom right corner of the eye box 8. FIG. 13 is a spot diagram of the head-up display device 30 of the second embodiment. FIG. 14A is an angle shift diagram of a main ray and the normal line of the liquid crystal display panel 2 at each field angle position. FIG. 14B is a drawing that shows the angle θ between the main ray and the normal line of the liquid crystal display panel 2. From FIG. 14A, it is known that the maximum value of the angle shift between the main ray and the normal line of the liquid crystal display panel 2 is as less as 2.8 degrees.

Therefore, according to the present embodiment, the head-up display device 30 can be provided which is made compact by a projection optical system using a free curved surface concave mirror, a free curved surface lens, and a concave lens.

Third Embodiment

Figure 18:
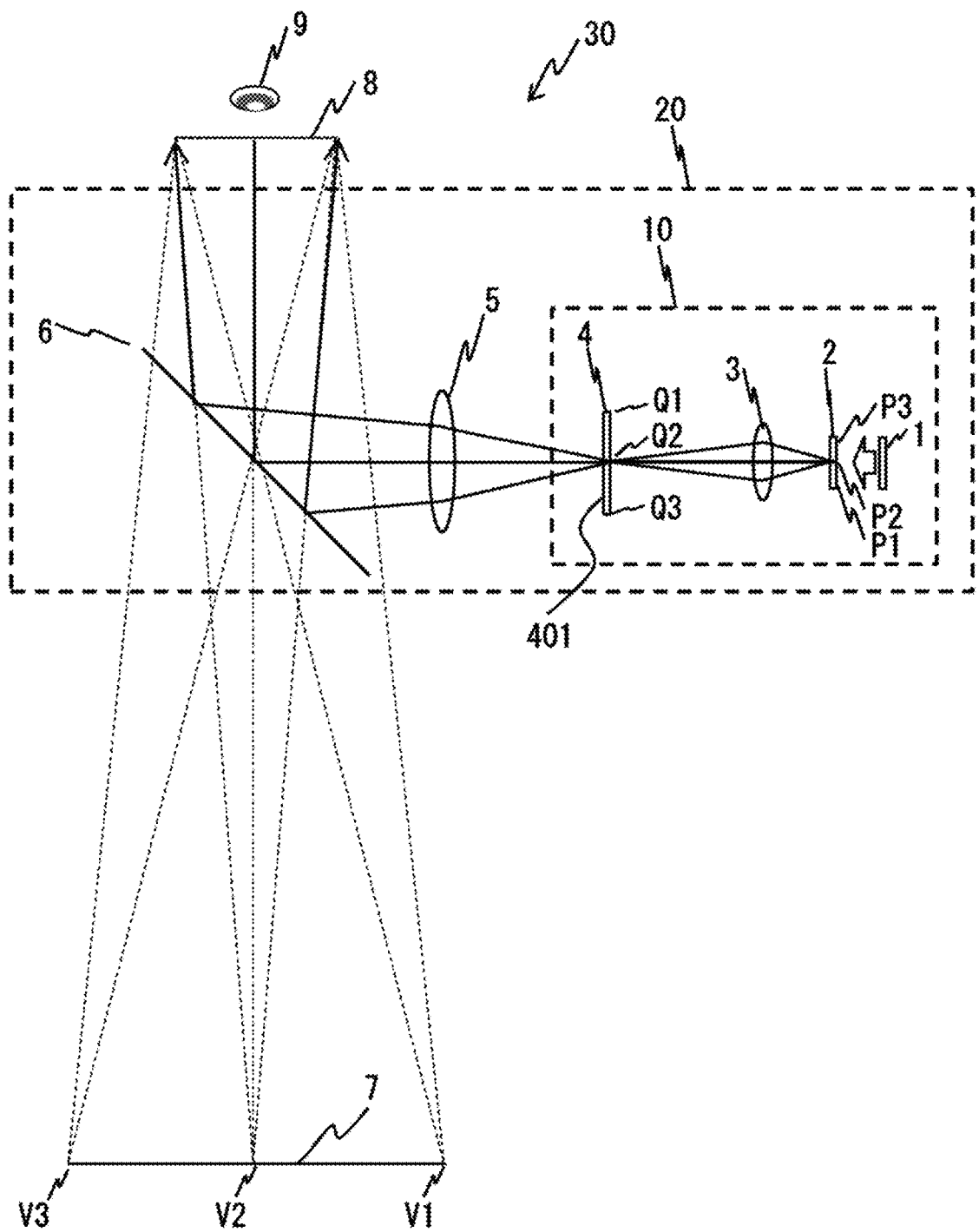
FIG. 18 is a schematic configuration drawing of an image forming unit provided in a head-up display device according to the third embodiment.

The third embodiment is featured in that the configuration of the image forming unit 10 is different from that of the first embodiment and the second embodiment. The third embodiment will be explained referring to FIG. 18. FIG. 18 is a schematic configuration drawing of an image forming unit provided in the head-up display device according to the third embodiment.

Although image information of the liquid crystal display panel 2 is enlarged directly by the eyepiece optical system 5 and is displayed as a virtual image in the first embodiment, instead of the configuration of this image forming unit 10, the liquid crystal display panel 2 that is more compact is used, image information of the liquid crystal display panel 2 is extension-mapped onto a screen plate (diffusion plate) by a relay optical system 3 that generates an image of a light-valve, and image information of it is enlarged by the eyepiece optical system and is displayed as a virtual image.

To be more specific, the light flux irradiated from the backlight 1 to the liquid crystal display panel 2 is made to be incident to the relay optical system 3 as an image light flux including the image information displayed on the liquid crystal display panel 2. The image light is emitted from an emission surface 401 of a screen plate 4 toward the eyepiece optical system 5. By the image forming action in the relay optical system 3, the image information on the liquid crystal display panel 2 is enlarged, and then the image information is magnified and projected on to the screen plate (diffusion plate) 4. Points P1/P2/P3 on the liquid crystal display panel 2 correspond to points Q1/Q2/Q3 on the screen plate (diffusion plate) 4 respectively. By using the relay optical system 3, a liquid crystal display panel with a small display size can be used. Since the backlight 1, the liquid crystal display panel 2, the relay optical system 3, and the screen plate (diffusion plate) 4 generate image information (image information) on the screen plate (diffusion plate) 4, they are collectively referred to as the image forming unit 10.

Also, the screen plate (diffusion plate) 4 is configured of a micro lens array where micro lenses are disposed 2-dimensionally. Thereby, a diffusion action occurs, the spread angle of the light flux emitted from the screen plate 4 is made large, and the size of the eye box 8 is made a predetermined size. Further, the diffusion action of the screen plate (diffusion plate) 4 can be achieved also by incorporating diffusion particles.

Fourth Embodiment

Figure 19:
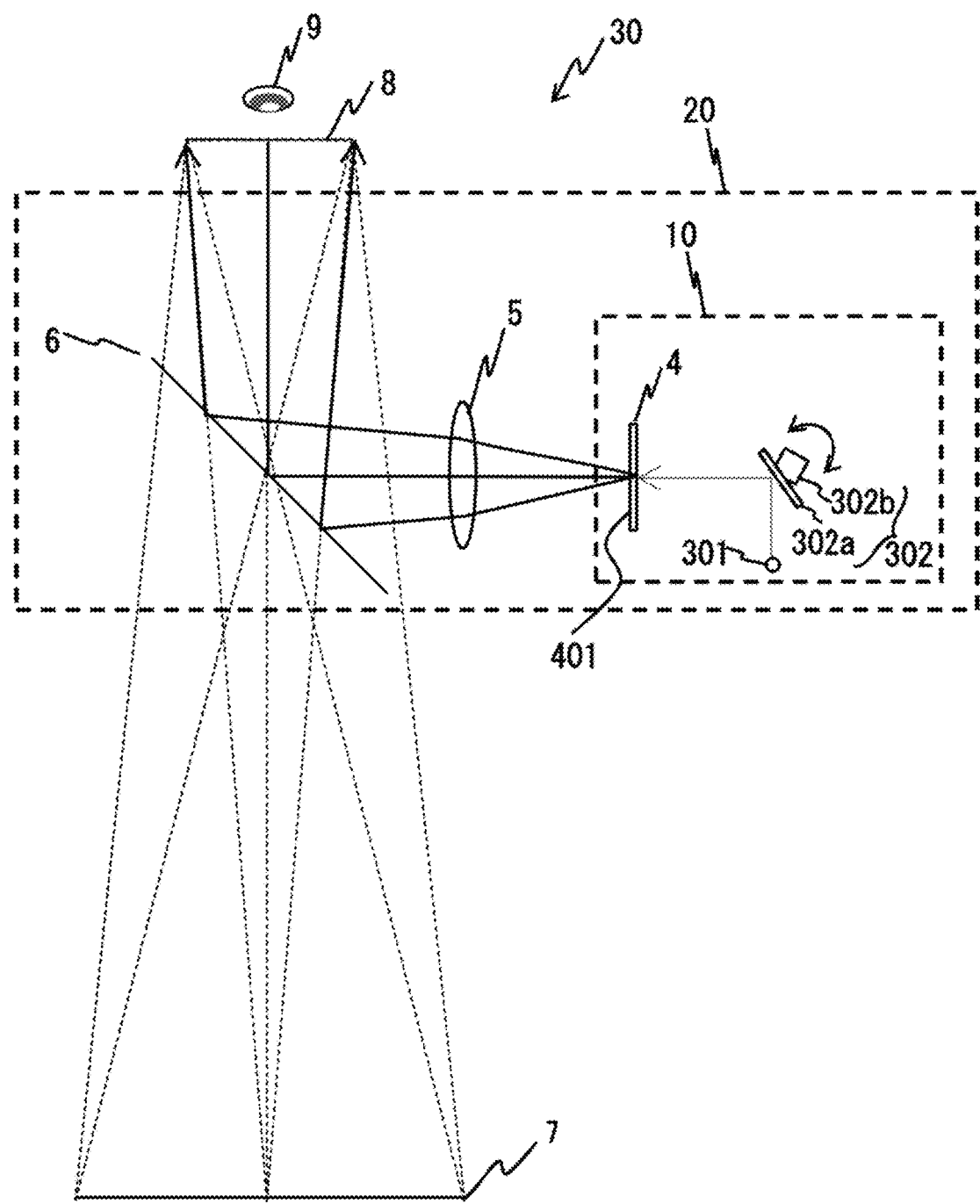
FIG. 19 is a schematic configuration drawing of an image forming unit provided in a head-up display device according to the fourth embodiment.

The fourth embodiment is featured in that the configuration of the image forming unit 10 is different from that of the first embodiment and the second embodiment. The fourth embodiment will be explained referring to FIG. 19. FIG. 19 is a schematic configuration drawing of an image forming unit provided in the head-up display device according to the fourth embodiment.

Although image information of the liquid crystal display panel 2 is mapped on the screen plate 4 that has a diffusion function in the first embodiment, instead of the configuration of this image forming unit 10, it may be configured to use a micro electro mechanical system (MEMS) that includes a laser light source 301, and a light scanning section 302 that scans laser light emitted from the laser light source 301. The light scanning section 302 includes a reflection surface 302a and a reflection surface rotation drive section 302b. The MEMS generates a light scanning image on the screen plate 4 by light-scanning of the laser, the screen plate 4 having a diffusion function. The image light is emitted from the emission surface 401 of the screen plate 4 toward the eyepiece optical system 5. The image forming unit of the fourth embodiment disposes the position where light scanning is effected by swinging the ray angle by the MEMS according to the exit pupil position. The rotation center position of the MEMS is configured matching a position assumed on the eyepiece optical system 5 side.

REFERENCE SIGNS LIST

1 . . . Backlight
2 . . . Liquid crystal display panel
3 . . . Relay optical system
4 . . . Screen plate (diffusion plate)
5 . . . Eyepiece optical system
6 . . . Windshield
7 . . . Virtual image plane
8 . . . Eye box
9 . . . Eyes of driver
10 . . . Image forming unit
20 . . . Projection optical system
30 . . . Head-up display device
51 . . . Concave lens
52 . . . Free curved surface lens
53 . . . Reflecting mirror
54 . . . Free curved surface concave mirror
101 . . . Focus position
102 . . . Diaphragm
103 . . . Convex lens
104 . . . Image surface

The invention claimed is:

1. A projection optical system including an eyepiece optical system that generates image information and displays a virtual image by reflecting image light emitted from an image forming unit that emits the image light containing the image information;
   wherein the optical system includes a concave lens, a free curved surface lens, and a free curved surface concave mirror disposed in order from the image forming unit side along an emission direction of the image light,
   wherein a surface opposing the image forming unit in the concave lens is formed into a flat shape, and
   the concave lens is disposed so that an optical axis of the concave lens is parallel to an optical axis of an emission surface of the image light in the image forming unit.

2. The projection optical system according to claim 1, wherein a value obtained by dividing a focal point distance of the concave lens by a focal point distance of the free curved surface concave mirror is equal to or greater than −0.6 and equal to or smaller than −0.3.

3. The projection optical system according to claim 1, wherein the concave lens is attached to the image forming unit through a holding member so as to oppose an emission surface of the image light in the image forming unit.

4. A projection optical system that generates image information and displays a virtual image by reflecting image light emitted from an image forming unit that emits the image light containing the image information:
   comprising an optical system including a concave lens, a free curved surface lens, and a free curved surface concave mirror disposed in order from the image forming unit side along an emission direction of the image light,
   wherein a first interplanar distance from an emission surface of the image light in the image forming unit to a surface that opposes the image forming unit in the concave lens is shorter than a second interplanar distance from the opposing surface to an emission surface where the image light made to be incident to the concave lens is emitted from the concave lens.

5. A head-up display device comprising:

an image forming unit that emits image light containing image information; and an optical system that displays a virtual image by reflecting the image light;

wherein the optical system includes a concave lens, a free curved surface lens, and a free curved surface concave mirror disposed in order from the image forming unit side along an emission direction of the image light, wherein the image forming unit includes a relay optical system that generates an image of a light valve, and a screen plate that has a diffusion function, and the concave lens is disposed so that an optical axis of the concave lens is disposed parallel to an optical axis of the screen plate.

6. The head-up display device according to claim 5;

wherein the image forming unit includes a backlight and a liquid crystal display panel, and the concave lens is disposed so that an optical axis of the concave lens is parallel to an optical axis of an emission surface of the liquid crystal display panel.

7. A head-up display device comprising:

an image forming unit that emits image light containing image information; and an optical system that displays a virtual image by reflecting the image light;

wherein the optical system includes a concave lens, a free curved surface lens, and a free curved surface concave mirror disposed in order from the image forming unit side along an emission direction of the image light, wherein the image forming unit includes a laser light source, a light scanning section that light-scans the laser light source by rotation of a reflection surface, and a screen plate that has a diffusion function, and the concave lens is disposed so that an optical axis of the concave lens is parallel to an optical axis of the screen plate.

* * * * *

UNITED STATES PATENT AND TRADEMARK OFFICE
CERTIFICATE OF CORRECTION

PATENT NO. : 11,169,376 B2
APPLICATION NO. : 16/338253
DATED : November 9, 2021
INVENTOR(S) : Masahiko Yatsu et al.

It is certified that error appears in the above-identified patent and that said Letters Patent is hereby corrected as shown below:

In the Claims

In Claim 1, at Column 14, Line 28, after the word "an", delete "eyepiece".

Signed and Sealed this
Fourteenth Day of February, 2023

Katherine Kelly Vidal
*Director of the United States Patent and Trademark Office*